US012790035B1

(12) United States Patent
Aguera-Arcas et al.

(10) Patent No.: US 12,790,035 B1
(45) Date of Patent: Nov. 10, 2026

(54) ARTIFICIAL INTELLIGENCE SATELLITE MODULE

(71) Applicant: Google LLC, Mountain View, CA (US)

(72) Inventors: Blaise Aguera-Arcas, Seattle, WA (US); Travis Roland Beals, Bowen Island (CA); Thomas Fischbacher, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/202,902

(22) Filed: May 8, 2025

(51) Int. Cl.

| | |
|---|---|
| ***B64G 1/50*** | (2006.01) |
| ***B64G 1/10*** | (2006.01) |
| ***B64G 1/26*** | (2006.01) |
| ***B64G 1/44*** | (2006.01) |
| ***G06N 3/02*** | (2006.01) |
| ***H02S 40/42*** | (2014.01) |

(52) U.S. Cl.
CPC ............... *B64G 1/506* (2013.01); *B64G 1/10* (2013.01); *B64G 1/262* (2023.08); *B64G 1/443* (2013.01); *G06N 3/02* (2013.01); *H02S 40/42* (2014.12)

(58) Field of Classification Search
CPC ........... B64G 1/506; B64G 1/443; G06N 3/02
See application file for complete search history.

(56) References Cited

U.S. PATENT DOCUMENTS

| | | | |
|---|---|---|---|
| 5,184,790 A | 2/1993 | Fowell | |
| 6,471,161 B1 | 10/2002 | D'Ambrosio et al. | |
| 10,536,107 B1 | 1/2020 | Ning et al. | |
| 12,017,806 B2 * | 6/2024 | Boccio | B64G 1/10 |
| 12,333,798 B2 * | 6/2025 | Gonzalez-Rivero | G06N 3/048 |
| 2015/0001345 A1 | 1/2015 | Polle | |

(Continued)

FOREIGN PATENT DOCUMENTS

| | | |
|---|---|---|
| CN | 108333660 A | 7/2018 |
| CN | 111901032 | 11/2020 |

(Continued)

OTHER PUBLICATIONS

Bird, "Advances in Deep Space Exploration via Simulators and Machine Learning" Dissertation for the degree of Doctor of Philosophy in Computer Science, University of California Santa Barbara, Jun. 2021, 96 pages.

(Continued)

*Primary Examiner* — Brian M O'Hara
(74) *Attorney, Agent, or Firm* — Fish & Richardson P.C.

(57) ABSTRACT

An artificial intelligence (AI) satellite module is described. The satellite module includes a solar panel having a first side that includes multiple solar cells and a second side that includes a power delivery network that distributes power signals generated by the solar cells. The satellite module includes at least one machine-learning ("ML") hardware accelerator adjacent to the solar panel. The ML accelerator is configured to implement an ML model (e.g., a neural network ML model). The satellite module includes a heat dissipation layer configured to radiate heat generated when the ML hardware accelerator is powered by the solar panel. The heat dissipation layer includes one or more heat pipes that: i) are coupled to the ML hardware accelerator, and ii) dissipate heat generated when the ML hardware accelerator executes a training or inference workload of the ML model.

39 Claims, 13 Drawing Sheets

(56) References Cited

U.S. PATENT DOCUMENTS

| | | | | |
|---|---|---|---|---|
| 2016/0128227 | A1 | 5/2016 | Gernert | |
| 2017/0008640 | A1 | 1/2017 | Mere | |
| 2019/0205789 | A1 | 7/2019 | Brumley, II et al. | |
| 2020/0021361 | A1 | 1/2020 | Kingsbury et al. | |
| 2020/0365512 | A1 | 11/2020 | Rothschild et al. | |
| 2021/0070478 | A1 | 3/2021 | Tillotson | |
| 2021/0284361 | A1 | 9/2021 | Reedy et al. | |
| 2021/0295546 | A1* | 9/2021 | He | G06T 7/55 |
| 2023/0093514 | A1 | 3/2023 | Wyler et al. | |
| 2023/0234724 | A1* | 7/2023 | Boccio | B64G 1/10 244/172.7 |
| 2023/0298341 | A1 | 9/2023 | Gonzalez-Rivero et al. | |
| 2023/0322417 | A1 | 10/2023 | Rey et al. | |
| 2024/0014894 | A1 | 1/2024 | Mukae et al. | |
| 2025/0085692 | A1 | 3/2025 | Snyder et al. | |
| 2025/0108938 | A1 | 4/2025 | Brophy et al. | |
| 2025/0157685 | A1 | 5/2025 | Nishizawa | |
| 2026/0036427 | A1 | 2/2026 | Melnyk et al. | |

FOREIGN PATENT DOCUMENTS

| | | | | |
|---|---|---|---|---|
| CN | 121158245 B * | 3/2026 | B64G 1/10 |
| WO | WO-2021163729 A1 * | 8/2021 | H04B 7/18543 |
| WO | WO 2023044155 | 3/2023 | |

OTHER PUBLICATIONS

Blog.palantir.com [online], "Palantir Edge AI in Space" Apr. 2022, retrieved on Oct. 1, 2024, retrieved from URL <https://blog.palantir.com/edge-ai-in-space- 93d793433ale>, 16 pages.
Eos.com [online], "Small Satellites: Technology That Democratizes Space" Feb. 2024, retrieved on Oct. 1, 2024, retrieved from URL <https://eos.com/blog/small-satellites/>, 8 pages.
Faedi, "Design and Analysis of Optical Links for Space Communications" Thesis for Master's degree in Electronic engineering and telecommunications for energy, University of Bologna, 2019-2020, 88 pages.
Kumar et al., "Development of Sun Tracking Solar Panel to Maximize Energy Generated in Satellites" International Journal of Advances in Engineering and Management (IJAEM), vol. 3, Issue 9, Sep. 2021, pp. 654-671.
Levchenko et al., "Space micropropulsion systems for Cubesats and small satellites: From proximate targets to furthermost frontiers" Applied Physics Reviews 5, 011104, Feb. 2018, 37 pages.
SmartSat Cooperative Research Centre, "Machine Learning onboard Satellites" Technical Report No. 010, Nov. 2021, 34 pages.
Benoot, "A Hitchhiker's Guide to Neural Network Design for Onboard Deployment in Space," European Data handling & Data Processing Conference (EDHPC) ESA, Oct. 2, 2023, 2023, 6 pages.
International Search Report and Written Opinion in International Appln. No. PCT/US2026/027090, mailed on Sep. 11, 2026, 25 pages.

* cited by examiner

ARTIFICIAL INTELLIGENCE SATELLITE MODULE

BACKGROUND

This specification generally relates to computing hardware for machine learning and artificial intelligence applications.

The expansion and integration of artificial intelligence (AI) or machine learning (ML) in modern edge/cloud devices have increased demand for specialized computing resources that can efficiently execute AI/ML workloads at scale. Datacenters and cloud platforms that provide specialized computing hardware are often constrained by the bandwidth, resource overhead, and electrical power requirements for distributed execution of AI/ML workloads across large-scale datacenters.

In general, AI/ML applications are implemented using machine-learning models and corresponding algorithms that are inherently software constructs. Interacting with AI tools and technology first requires that these software constructs be implemented or executed on the specialized computing hardware mentioned above. For example, these hardware resources include special-purpose integrated circuits configured to perform the large-scale matrix and vector computations that are fundamental to most ML models and algorithms. These special-purpose integrated circuits are commonly referred to as ML hardware accelerators and include proprietary AI/ML processors and matrix/vector units with compute architectures that are optimized for ML training, inference, or both.

The availability and rise of open-source code and other resources for implementing ML models will translate to increased demand for the special-purpose circuits that are optimized to implement the ML models and algorithms. As the demand for these AI/M L computing assets outpaces available capacity in existing data centers, new techniques and environments for implementing ML models on specialized computing hardware will be central to the growth and further development of AI/ML technologies.

SUMMARY

This specification describes a hardware satellite module for power-efficient execution of machine-learning ("ML") computations in space. The satellite module can be configured as a planar satellite and is referred to alternatively herein as a "planar satellite." The satellite module allows for space-bound artificial intelligence (AI) computing workloads to be implemented in a power-efficient manner by converting solar energy into electrical power and performing AI/ML tasks, such as model training and/or inference.

The satellite module includes: i) a solar panel that generates power, ii) multiple special-purpose integrated circuits that are configured to implement machine-learning ("ML") models and execute ML computations, and iii) a heat dissipation layer that radiates away heat generated by components of the satellite module, such as the integrated circuits or other devices/sources that generate heat. The satellite module also includes a frame, or other structural elements, that provide structural support for the different layers of the satellite module. In particular, the solar panel, special-purpose circuits, and heat dissipation layer can be coupled together and structurally supported by the frame or other structural elements. The satellite module also includes subsystems for propulsion, attitude control, communication (e.g., optical, radio frequency), and other types of satellite subsystems for AI computing workloads in space.

The solar panel includes: i) a first side with multiple photovoltaic (or solar) cells that are used to generate power by converting solar energy to electrical energy, and ii) a second side that includes a power delivery network that provides the power to devices of the satellite module. For example, the power delivery network of the solar panel distributes power to the integrated circuits of the satellite module, which includes the ML hardware accelerators that execute the AI/ML workloads. The special-purpose integrated circuits can include a set or layer of ML hardware accelerators, which represents an ML hardware accelerator layer ("ML hardware layer") of the satellite module. Each of the ML accelerators is configured to perform A I/ML workloads and tasks (individually or collectively) using AI/ML models that are based on neural networks and other ML algorithms.

The ML hardware layer can include computational elements such as tensor processing units (TPUs), graphics processing units (GPUs), application-specific integrated circuits (ASICs), central processing units (CPUs), dynamic memory, and non-volatile storage, among other types of chips and circuitry for computing. In general, each of these elements can be mounted, formed, or otherwise integrated on a wafer, interposer, or circuit board. The circuitry or wafer(s) for the ML hardware layer can also include subsystems for control and maneuverability of the satellite module. A control unit of the circuitry can adjust the orientation of the satellite module to maximize solar collection, e.g., by increasing an amount of surface area on the solar panel that is sun-facing, thereby increasing collection and conversion of solar power to electrical power. The wafer(s) for the ML hardware layer can include (or be coupled to) communications modules that facilitate signal communications between components of an individual satellite module and between at least two distinct satellites.

The heat dissipation layer includes heat-transfer components that distribute heat generated at the satellite module. The heat-transfer components can include active heat pumps, heat pipes, or both. These transfer components/structures distribute heat generated from powering components of the satellite module, such as the special-purpose integrated circuits that implement the ML models, to surfaces that radiate the heat into space. For example, a heat pipe of the heat dissipation layer can be coupled to the layer of ML hardware accelerators to dissipate heat generated by an inference accelerator integrated at that ML hardware layer. The heat dissipation layer can also be configured to maintain a particular operating temperature for the ML hardware layer. In particular, the heat dissipation layer can be used to radiate away excess heat to maintain or achieve a desired temperature of the ML hardware layer.

One aspect of the subject matter described in this specification can be embodied in a satellite module. The satellite module includes a solar panel that further includes i) a first side that includes a plurality of solar cells and ii) a second side that includes a power delivery network configured to distribute power signals generated by the plurality of solar cells. The satellite module includes at least one machine-learning ("ML") hardware accelerator adjacent to the solar panel, the at least one ML hardware accelerator configured to implement a neural network ML model. The satellite module includes a heat dissipation layer configured to radiate heat generated when the at least one ML hardware accelerator is powered by the power signals. The heat dissipation layer includes a plurality of heat pipes that are coupled to the at least one ML hardware accelerator and are configured to dissipate heat generated when the at least one ML hardware accelerator executes a training or inference workload of the neural network ML model.

These and other implementations can each optionally include one or more of the following features. For example, in some implementations, each of the plurality of ML hardware accelerators are intermediate the solar panel and the heat dissipation layer.

In some implementations, the at least one ML hardware accelerator is intermediate the solar panel and the heat dissipation layer.

In some implementations, the satellite module includes a frame configured as a support structure, and one or both of the solar panel and the heat dissipation layer are supported by the frame.

In some implementations, the satellite module includes a filter layer adjacent the first side of the solar panel, the filter layer being configured to filter wavelengths of light that correspond to a particular portion of the electromagnetic spectrum. The filter layer can be an IR cut-off filter having an anti-reflective property. The filter layer can be a transparent, glass, IR cut-off filter having an anti-reflective property.

In some implementations, the satellite module can include a substrate layer at the second side of the solar panel and adjacent the power delivery network. The substrate layer can be configured to provide a measure of structural rigidity to the plurality of solar cells of the solar panel. In some implementations, the substrate layer is a thin-film metal substrate. In some implementations, the substrate layer is a thin-film metal substrate including a particular thermal radiation emissivity that is supplemental to a thermal radiation property of the heat dissipation layer. In some implementations, the substrate layer includes a plurality of sublayers configured as a composite metal stack. In some implementations, the susbtrate layer includes a plurality of sublayers configured as a composite metal stack configured to provide: i) thermal spreading; ii) heat dissipation; and iii) structural stiffness in support of the solar panel.

In some implementations, the satellite module includes a carbon fiber exoskeleton that is configured as an extension of: i) the substrate layer and ii) the support structure of the frame. The carbon fiber exoskeleton can include vibration damping properties that enable the carbon fiber exoskeleton to withstand stresses imparted on the satellite module when the satellite module is launched into orbit.

In some implementations, the at least one ML hardware accelerator is a tensor processing unit (TPU) configured to perform ML computations by executing matrix multiplication on multi-dimensional matrices during a training phase or an inference phase of the neural network ML model.

In some implementations, the heat dissipation layer includes a vapor chamber coupled to at least one heat pipe of the plurality of heat pipes.

In some implementations, i) a signal routing aspect of the power delivery network is disposed at a first sublayer of the plurality of sublayers and ii) the at least one ML hardware accelerator is disposed at a second sublayer of the plurality of sublayers.

In some implementations, the satellite module includes a control module disposed at the second sublayer and configured to control operation of the satellite module based on control signals that traverse different communication pathways of the satellite. A first subset of the communication pathways is configured to transmit data including control signals between the control module and the at least one ML hardware accelerator. A second subset of the communication pathways is configured to transmit data including compute data between the control module and the at least one ML hardware accelerator. In some implementations, the satellite module further includes at least two ML hardware accelerators, and the at least one ML hardware accelerator is included among the at least two ML hardware accelerators. A third subset of the communication pathways is configured to transmit data between the at least two ML hardware accelerators.

In some implementations, i) the plurality of subsystems of the satellite module includes a propulsion subsystem for controlling a thruster of the satellite module and ii) the thruster is disposed along a periphery or external surface of the satellite module. In some implementations, i) the plurality of subsystems of the satellite module includes a propulsion subsystem for controlling a plurality of directional thrusters and ii) each of the plurality of directional thrusters is arranged at a different location along a periphery or external surface of the satellite module relative to another thruster of the plurality of thrusters. The propulsion subsystem can include a plurality of control mechanisms including one or more of: i) a reaction wheel, ii) a control moment gyroscope, and iii) a magnetorquer.

In some implementations, the plurality of subsystems includes a communication subsystem disposed at the substrate layer. In some implementations, the satellite module includes a first aperture at a central location of a first planar surface of the satellite module and at least one physical connector supported at the first aperture. The at least one physical connector is associated with the communication subsystem and is configured to exchange data communications with another satellite module. In some implementations, the at least one physical connector includes i) a first end adjacent the first planar surface, ii) a swivel member at the first end, and iii) a second end opposite the first end, the second end being positionable relative to the first end by way of the swivel member.

In some implementations, the satellite module includes a second aperture at a central location of a second planar surface of the satellite module and a central module disposed in the second aperture. The central module includes one or more inter-satellite links that are configured to be oriented independent of the plurality of solar cells of the solar panel. The central module can include a gimbaled thrust system supported by the second aperture, the gimbaled thrust system including a directional thruster that is rotatable about a central axis of the second aperture.

In some implementations, the satellite module includes one or more electromagnetic coils integrated at the substrate layer. The one or more electromagnetic coils can be configured to generate a magnetic field using current signals generated by the solar panel. The magnetic field provides a magnetic dipole propulsion source of the satellite module.

Another aspect of the subject matter described in this specification can be embodied in a satellite that includes a satellite bus. The satellite bus includes at least one machine-learning ("ML") hardware accelerator configured to implement a neural network ML model. The satellite bus includes a heat dissipation layer configured to radiate heat generated when the at least one ML hardware accelerator is powered by power signals. The satellite includes one or more solar arrays coupled to the satellite bus, each of the one or more arrays includes i) a first side that includes a plurality of solar cells and ii) a second side that includes a power delivery network configured to distribute power signals generated by the plurality of solar cells. The heat dissipation layer includes a plurality of heat pipes that are coupled to the at least one ML hardware accelerator and dissipate heat generated when the at least one ML hardware accelerator executes a training or inference workload of the neural network ML model.

In some implementations, each of the one or more solar arrays includes an array of foldable panels. Each of the one or more solar arrays can be coupled to the satellite bus by a respective deployment mechanism. In some implementations, the respective deployment mechanism of each of the one or more solar arrays is configured to extend the respective solar array along an outward direction that is substantially perpendicular to a surface of the satellite bus. In some implementations, extending the respective solar array along the outward direction includes unfolding the array of foldable panels. In some implementations, the respective deployment mechanism of each of the one or more solar arrays is configured to retract the respective solar array along an inward direction that is substantially perpendicular to a surface of the satellite bus. In some implementations, retracting the respective solar array along the inward direction includes folding the array of foldable panels. In some implementations, the respective deployment mechanism of each of the one or more solar arrays is configured to adjust an angle of orientation of the respective solar array by rotating the respective solar array about an axis that is substantially perpendicular to a surface of the satellite bus.

In some implementations, the satellite bus further includes a sublayer coupled to one or both of the at least one ML hardware accelerator and the heat dissipation layer. In some implementations, a control module is at the sublayer and configured to control an operation of the satellite based on control signals that traverse different communication pathways of the satellite. In some implementations, a first subset of the communication pathways is configured to transmit data including control signals between the control module and the at least one ML hardware accelerator. In some implementations, a second subset of the communication pathways is configured to transmit data including compute data between the control module and the at least one ML hardware accelerator. In some implementations, the satellite further includes at least two ML hardware accelerators and the at least one ML hardware accelerator is included among the at least two ML hardware accelerators. A third subset of the communication pathways can be configured to transmit data between the at least two ML hardware accelerators.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation causes the system to perform the actions. One or more computer programs can be configured by virtue of having instructions that, when executed by a data processing apparatus, cause the apparatus to perform the actions. Moreover, optional features described in the context of one aspect (e.g., a satellite module) may be implemented in combination with another aspect (e.g., a satellite).

The subject matter described in this specification can be implemented in particular embodiments to realize one or more of the following advantages.

Increasing demands for AI computing will ultimately reduce available physical space and power allocations that are needed to execute ML workloads/tasks on terrestrial-based computing assets. These terrestrial assets for AI/ML computations are often represented by cloud infrastructures, including data centers, server farms, distributed computing platforms, as well as related ancillary assets, such as electric grids and microgrids. Each of these assets can have a sizable footprint with regard to electrical power demands and physical space.

To address these challenges with available power and space, the specification describes an AI satellite module that is configured to orbit a celestial body or system of bodies, such as the Earth or an Earth-Sun Lagrange Point. The satellite module can be configured to maintain a target orientation, e.g., a sun-facing orientation, to collect and convert solar power as a power supply for space-based execution of AI/ML computations. In contrast to the physical space available on Earth, the satellite module leverages the vast amount of space that is available when the satellite module orbits the celestial body, or system of bodies.

The satellite modules also leverage solar rays to perform energy-intensive computing (e.g., 1,000 W per computing element), while occupying a smaller physical footprint than terrestrial-based computing assets. Each satellite module relies on solar energy as a renewable energy source, thereby providing AI computing with little to no carbon emissions. In contrast to renewable, terrestrial power generation, the satellite module's use of renewable solar energy and direct coupling to its ML hardware layer allows for a more streamlined design for on-board power generation. For example, the satellite module requires fewer power conversion hardware components, such as converters, inverters, transmission lines, or batteries.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
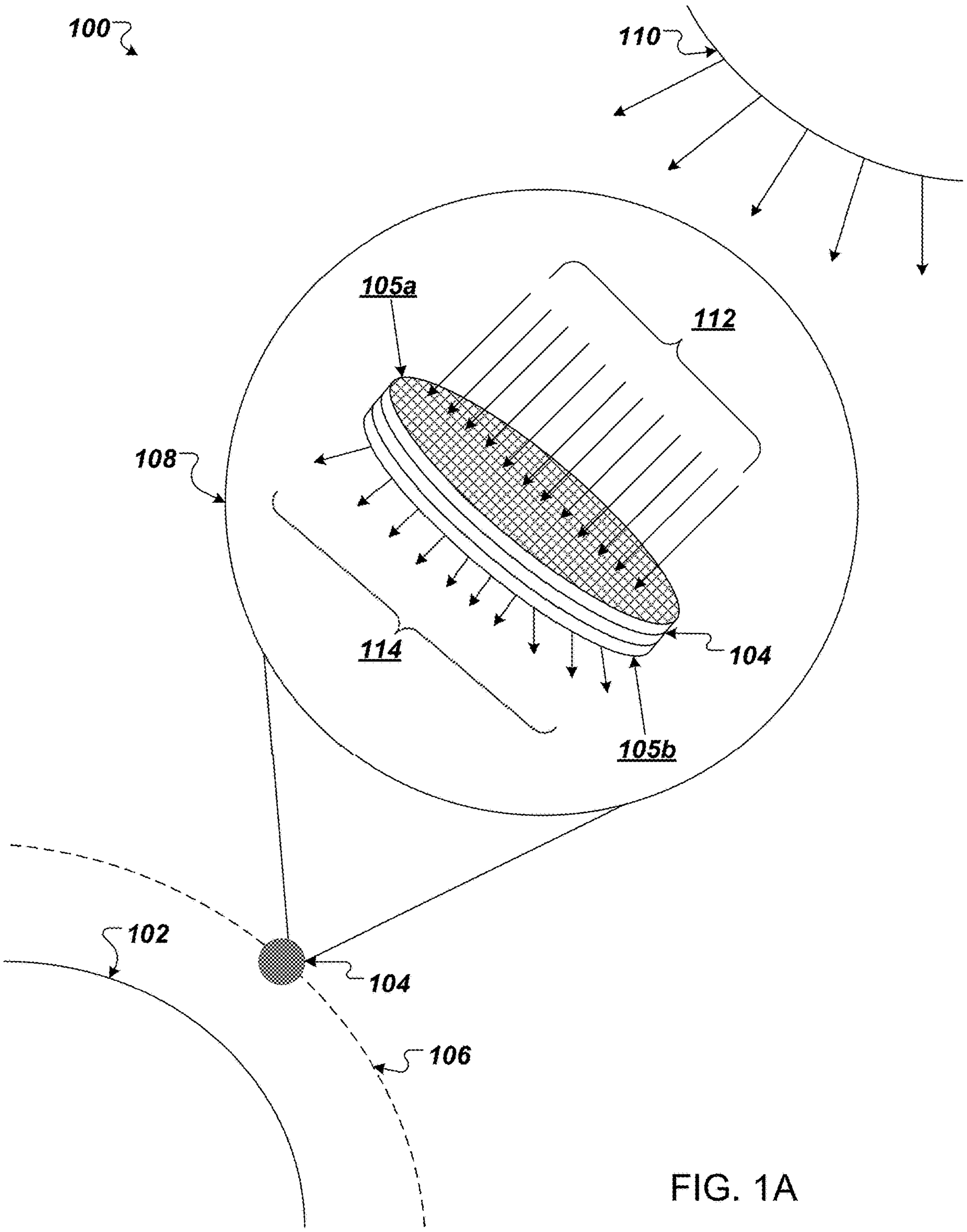
FIG. 1A is a diagram of an example artificial intelligence (AI) satellite module.

FIG. 1A is a diagram of an example extraterrestrial environment 100 (referred to herein as "environment 100") for an artificial intelligence (AI) satellite module 104. The AI satellite module 104 can also be referred to as a "planar satellite 104," where a shape, structure, or physical design of the satellite module 104 can be planar or substantially planar. For example, the AI satellite module 104 can have a planar shape that is relatively flat and thin. The AI satellite module 104 is referred to alternatively as "satellite 104." Although FIG. 1A depicts the satellite 104 with a circular shape, the satellite 104 can have any outline or shape, e.g., hexagonal, square, and a relatively small size. For example, the satellite 104 can have a diameter of approximately 2 meters (e.g., fora circular shape), a size of approximately 2 meters by 2 meters (e.g., fora square shape), or a size of approximately 6 square meters for a hexagonal shape.

The environment 100 illustrates the satellite 104 maneuvering around a celestial body 102, e.g., a planet, moon, asteroid, or other type of object in space, along an orbital path 106. In the example of FIG. 1A, the orbital path 106 is depicted as a curved dashed line that indicates an altitude of the satellite module 104 relative to the celestial body's surface. An example celestial body 102 can include the Earth. Although FIG. 1A depicts celestial body 102 as a single celestial body, the celestial body 102 can be a system of celestial bodies. For example, the system of celestial bodies can include a planet and its moons, satellites in the planet's orbit, etc. The satellite 104 can maintain any orbital path 106 (or "orbit 106") around the celestial body 102, such as a geosynchronous orbit, low-Earth orbit (LEO), sun-synchronous orbit, decaying orbit, earth-trailing orbit, graveyard orbit, parking orbit, among other types of satellite orbits.

The environment 100 also includes a source 110 that emits or radiates light waves transporting light energy throughout the environment 100. For example, the source 110 can be a sun that radiates solar energy in the form of electromagnetic radiation that spans a broad spectrum of wavelengths. FIG. 1A illustrates a callout 108 that shows a zoomed-in view of the satellite 104 to depict the orientation of the satellite 104, e.g., relative to the celestial body 102 and the source 110. The callout 108 shows the satellite 104 having a first side **105*a* and a second side 105*b* opposite of the first side 105*a*. In the example of FIG. 1A, the first side 105*a* faces the source 110, whereas the second side 105*b* faces the celestial body 102**.

The first side **105*a* can be referred to as a "top surface 105*a*," and the second side 105*b* can be referred to as a "bottom surface 105*b*." The top surface 105*a* can be part of a solar panel layer ("solar panel") of the satellite 104 that allows for the collection of light energy and the conversion of light energy into electrical power. The satellite 104 includes a layer of machine-learning ("ML") hardware accelerators adjacent to the solar panel layer. For example, this ML hardware layer can be below the top surface 105*a* and can utilize power generated by the top surface 105*a***, e.g., the solar panel layer, to perform inference and/or training ML workloads using the inference accelerators of the ML hardware layer.

The source 110 emits light energy in the form of electromagnetic radiation, which is represented by solar rays 112 that are received by the top surface **105*a* of satellite 104 at an incident angle. Although FIG. 1A depicts the rays 112 arriving at the satellite 104 at a substantially perpendicular incident angle relative to the top surface 105*a*, the satellite 104 can also receive rays at any incident angle that permits light energy to be received by a side of the solar panel layer that coincides with the top surface 105*a* of the satellite 104**.

Referring to the bottom surface **105*b* of the satellite 104, the bottom surface 105*b* can be part of a heat dissipation layer that is adjacent to the ML hardware layer of the satellite 104. The heat dissipation layer radiates away heat from the satellite 104, such as heat from excess energy received from the top surface 105*a* and heat generated from the ML hardware layer when the inference accelerators are powered on to execute computations for ML tasks. The heat dissipation layer is configured to regulate the temperature of the satellite 104, such as by maintaining a target temperature or range of temperatures for the ML hardware. In some implementations, the ML hardware layer of satellite 104 is interposed between the solar panel layer and the heat dissipation layer. These and other layers of the satellite 104 are described in more detail below with reference to FIGS. 1B, and 2A through 2**E.

The heat dissipation layer is configured to remove or reduce heat energy generated from components and/or circuitry in the satellite module 104. For example, the heat dissipation layer is configured to remove or reduce the heat by way of heat transfer through dissipation, distribution, radiation, or combinations thereof. The heat dissipation layer, for example, can transfer away (e.g., by dissipating, distributing, radiating) heat generated by components of the satellite 104, such as the ML accelerators, solar panel layer, power delivery network, or integrated circuits of the satellite 104.

The satellite 104 can also be configured to convert other types of electromagnetic energy into electric power for computing tasks, e.g., training tasks, inference tasks. For example, the top surface **105*a* of the satellite 104 can be part of a layer of devices configured to convert forms of electromagnetic radiation (e.g., infrared, radio waves, gamma waves, ultraviolet). Examples of devices that use light waves to generate electric power for the satellite 104** can include thermophotovoltaic cells, UV photovoltaic cells, and other types of solar cells.

The callout 108 of FIG. 1A depicts heatwaves 114 radiating from the bottom surface **105*b* of the satellite 104. The heat dissipation layer of the bottom surface 105*b* can be configured to radiate heat in a direction away from the satellite 104, e.g., to radiate an amount of heat. The satellite 104 can be configured to radiate away heat represented by heat waves 114 to achieve a target temperature or range of temperatures for the satellite 104. For example, the satellite 104** can prevent overheating of ML hardware and other components by radiating an amount of heat that maintains the temperature of components below a threshold temperature.

The threshold temperature can be an operating temperature that, if exceeded, reduces efficiency and/or prevents (or degrades) operability of the components in the environment 100. The satellite 104 can be configured to radiate away heat to maintain a temperature of a satellite 104 at, above, or below a particular threshold value that allows for improving operability and/or efficiency of certain components. For example, abnormally low operating temperatures for components in the ML layer (or other layers) can degrade performance or operability of the satellite 104, such as delaying circuit response times, reducing structural integrity, and decreasing performance for semiconductor material.

The satellite 104 can also be configured to distribute and radiate away heat represented by heat waves 114 to reduce impact on orientation and position of the satellite 104. For example, the satellite 104 can determine a target value or range of values for orientation, position, etc., and radiate an amount of heat to reduce thermal recoil effect, which includes forces resulting from radiating heat that can affect the position or orientation of a satellite module 104.

Although FIG. 1A depicts the satellite 104 collecting light energy represented by solar rays 112 emitted by source 110, the satellite 104 can be configured to collect light energy from other sources. For example, the satellite 104 can be configured to collect light energy based on light waves that are refracted or reflected from other objects or sources other than source 110, e.g., celestial body 102. In contrast to the top surface 105*a* facing the source 110, the satellite 104 can adjust its orientation so that top surface 105*a* is facing the celestial body 102, which allows the solar panel layer to receive any light waves that are reflected or refracted from the celestial body 102. In this way, the satellite 104 can be configured to maintain an orbit that increases energy collection by collecting light energy from other sources or objects.

Figure 1B:
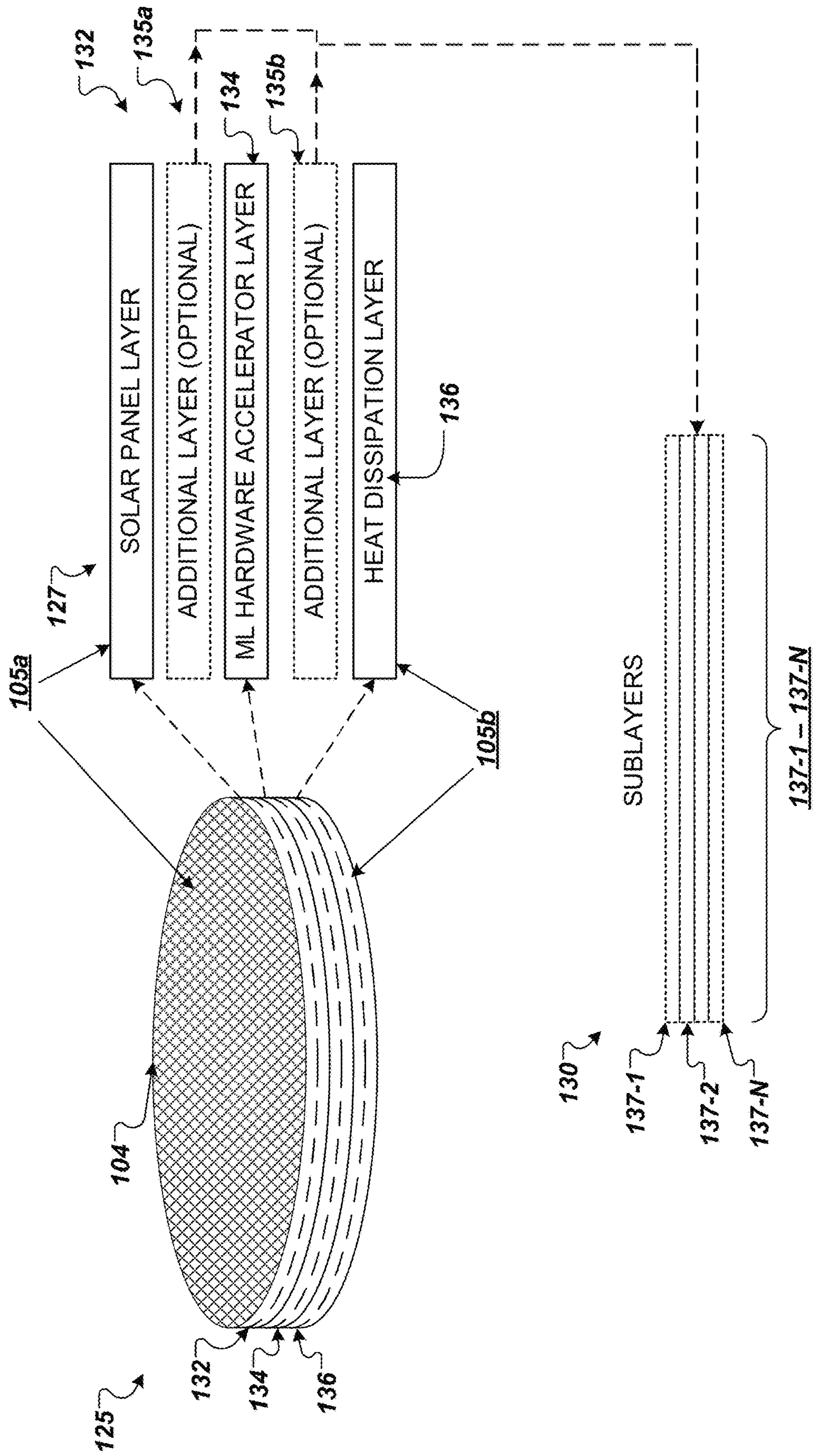
FIG. 1B shows a perspective view and a sideview of the AI satellite module of FIG. 1A.

FIG. 1B shows a perspective view 125 of the AI satellite 104 of FIG. 1A as well as side view 130 of the AI satellite 104 of FIG. 1A. The perspective view 125 shows the satellite 104 having at least three layers 132, 134, and 136. FIG. 1B also includes an example stacked configuration 127 that shows the satellite 104 having solar panel layer 132, ML hardware layer 134, and heat dissipation layer 136, but can optionally include one or more additional layers, such as additional layer 135*a* and additional layer 135*b*, between two different layers for the satellite 104.

FIG. 1B depicts additional layer(s) 135*a* between the solar panel layer 132 and the ML hardware layer 134, and additional layer(s) 135*b* between the ML hardware layer 134 and the heat dissipation layer 136. However, the relative placement of an additional layer 135*a*/135*b* can differ from the placements depicted in the example stacked configuration 127 of FIG. 1B. For example, an additional layer 135*a*/135*b* can be placed adjacent any one of layers 132, 134, 136 based on design preference, manufacturing constraints, or both. Each layer can be electrically coupled to an adjacent layer of the satellite 104. For example, the solar panel layer 132 can be electrically coupled to the ML hardware layer 134, additional layer 135*a*/135*b*, or both. Similarly, the ML hardware layer 134 can be electrically coupled to the heat dissipation layer 136, additional layer 135*a*/135*b*, or both. In some cases, the satellite 104 can include interconnections between two or more of its layers to allow for the transfer of power, heat, data, and/or signals between those layers.

The layers 132, 134, 136 of the satellite 104, and optionally additional layers 135*a* and 135*b*, can be formed atop a base material or substrate layer, such as a silicon wafer or semiconductor substrate. In some implementations, the substrate layer provides a planar, wafer-like shape for the satellite 104. For example, the satellite 104 can be relatively flat, thin, and lightweight, to reduce costs associated with launching the satellite 104 into space and/or maintaining orbits for the satellite 104. In this way, the satellite 104 can provide cluster-scale A I compute without depending on the physical space allocations required for terrestrial data centers and related computing environments.

The perspective view 125 shows the top surface 105*a* as part of the solar panel layer 132 and the bottom surface 105*b* as part of the heat dissipation layer 136. The solar panel layer 132 has a first side that includes an array of solar cells and a second side that includes a power delivery network, each of which are described below. As indicated at FIG. 1B, in some implementations the first side of the solar panel layer 132 coincides with top surface 105*a* of a satellite module 104. The example of FIG. 1B shows a perspective view 125 of a satellite 104 with three layers 132, 134, 136, but the satellite 104 can have any number of layers based on design preference, including one or more of the additional layers 135*a*, 135*b*.

For example, the solar panel layer 132 can include additional layer 135*a*, such as a silicon wafer substrate layer, with conductive traces to route current signals that facilitate power delivery from the solar panel layer 132 to the ML hardware layer 134. This additional layer 135*a* can be electrically coupled to the second side of the solar panel layer 132, the first side of the solar panel layer 132, or both. For example, this additional layer 135*a* can be bonded to the second side of the solar panel layer 132 using a conductive epoxy adhesive that facilitates electrical coupling to the second side.

As described above, satellite 104 is configured to convert light energy into electrical power. In some implementations, both the top surface 105*a* and the bottom surface 105*b* of the satellite 104 can be configured to radiate heat. For example, the satellite 104 can be configured to: i) generate power by way of light energy conversion into electrical power, and ii) radiate excess heat associated with the received light energy and generated electrical power. The amount of light energy received from source 110 can be characterized or quantized based on solar irradiance, which is the power per unit area (surface power density) received from the Sun. The amount of light energy (or solar irradiance) can vary based on a distance between the satellite 104 and a source of light energy, such as source 110. In an example described below, the received light energy or solar irradiance can be approximately 1360 Watts per square meter, 1360 $W/m^2$.

The solar panel layer 132 can have an emissivity that indicates its emission of thermal radiation. This emissivity is represented by a dimensionless number between 0 and 1, where 0 indicates no emission of thermal radiation and 1 indicates maximum emission of thermal radiation. As an example, the solar irradiance at satellite 104 for an orbital distance relative to source 110 is 1360 $W/m^2$. The solar panel layer 132 can have an emissivity of 0.7, resulting in approximately 950 Watts of power, or 475 $W/m^2$, being absorbed by the satellite 104. In some implementations, this 950 W of energy/power is absorbed in the form of heat and electricity as the satellite 104 orbits both celestial body 102 and source 110 in a source-facing orientation. The satellite 104 is configured to generate and distribute electrical power concurrent with distributing and radiating away excess heat generated from current/power signals traversing conductors at the ML hardware layer 134 or other areas of satellite 104. For example, of the 950 W of power (e.g., heat), approximately 550 W can be evenly distributed across the solar panel layer 132 in the form of solar heating, whereas 400 W of heat in the form of power signal routing may be localized to the compute chips. For example, the satellite 104 can provide the 400 W of power to the ML hardware layer 134 to perform ML inference computing tasks. The solar panel layer 132 and heat dissipation layer 136 can serve as heat radiators that cooperate to radiate away a substantial portion of the heat represented by the 950 Watts, which mitigates or prevents overheating of electrical components of the satellite 104. In some implementations, a computing element of the ML hardware layer 134 consumes 1,000 W of power for training and/or inference tasks using a neural network implemented ML accelerator of the ML hardware layer 134.

The additional/substrate layer 135*a* can provide structural rigidity for components of the solar panel layer 132, such as the solar array of cells and associated photovoltaic diodes for the solar cells. Examples of substrate materials for the satellite 104 can include Beryllium, Silicon, Gallium Nitride, Germanium, or Gallium Arsenide. The substrate layer 135*a* can be attached or bonded to a back side of the solar panel layer 132, as described above. In some implementations, the substrate layer 135*a* and the solar panel layer 132 are integrally formed, e.g., by integrating or depositing portions of substrate material onto a particular side of the solar panel layer 132.

The substrate layer 135*a* can be a thin-film substrate between the solar panel layer 132 and the ML hardware layer 134. This thin-film substrate layer can be made up of metal and/or composite materials, and is configured to provide heat dissipation, electrical power, structural support, or some combination thereof. For example, the substrate layer 135*a* can be a thin-film metal substrate, or composite substrate, that has a particular thermal radiation emissivity. The thermal radiation emissivity of the thin-film metal substrate 135*a* can be supplemental to a thermal radiation property of the heat dissipation layer 136 of the satellite 104.

The thermal radiation emissivity of the substrate layer 135*a* can provide an additional (or enhanced) measure of thermal spreading and heat dissipation at the satellite 104. The substrate layer 135*a* can also provide structural stiffness in support of different layers of the satellite 104, such as the solar panel layer 132, the heat dissipation layer 136, or other layers. This structural stiffness can be used to withstand forces imparted on the satellite 104 when the satellite is launched into orbit. The structural stiffness can also mitigate occurrences of deformation that might otherwise occur when external forces are applied to the satellite 104 as it moves along its orbital path.

An additional layer 135*b* can be coupled to the ML hardware layer 134 to increase the amount of ML computing hardware available on a satellite 104. In contrast to the amount of computing elements at a single ML hardware layer 134, including an additional layer 135*b* of special-purpose hardware for in-orbit ML compute provides more data processing and computing resources for executing ML training and/or inference tasks on the satellite 104. The ML computing elements can be distributed across the ML hardware layer 134 as well as other areas of the satellite 104. A n ML hardware layer 134, including one or more additional layers 135*b*, configured for on-orbit AI/ML compute may be referred to as a computing system of the satellite 104. The ML layer is also described below with reference to the example of FIG. 2B.

The satellite 104 can include one or more subsystems for integrating certain functionality within the satellite 104. For example, the satellite 104 can include a control module (or subsystem), a communication subsystem, and a propulsion subsystem. In some implementations, the satellite 104 includes a single subsystem that integrates a combination of these control, communication, and propulsion functions. The subsystems for the satellite 104 can be mounted on and/or embedded into one or more layers of the satellite 104. For example, one or more of the subsystems can be disposed at the ML hardware layer 134, an additional layer 135*b*, or both. In some implementations, one or more of the subsystems are mounted on, or disposed at, additional layer 135*a* or 135*b* to maximize available surface area on the ML hardware layer 134 for integrating ML computing elements. The subsystems are described in more detail below with reference to FIGS. 2A-2E. Relatedly, an example of a propulsion subsystem is described below with reference to FIGS. 2C and 2D.

Rather than a single heat dissipation layer 136, the satellite 104 can be configured to include an additional layer 135*b* of heatsink structures, such as heat pipes, vapor chambers, and radiating elements, to provide additional heat distribution and radiation, including enhanced thermal spreading. In some implementations, the satellite 104 includes multiple heat dissipation layers 136 along with at least one additional layer 135*b* of heatsink structures. The additional layer 135*b* can be coupled to the heat dissipation layer 136 and can be configured to provide a gradual temperature transition and smoother temperature gradients to reduce a likelihood of thermal shock. Thus, when compared to a single heat dissipation layer 136, including and coupling an additional layer 135*b* of heatsink structures with the heat dissipation layer 136 improves overall thermal management.

In some implementations, one or both additional layers 135*a* or 135*b* can include multiple sublayers, e.g., sublayers 137-1 through 137-N(collectively referred to as "sublayers 137"). The sublayers 137 can be configured as a composite metal stack to provide additional thermal management and structural support. For example, the sublayers 137 can provide additional thermal spreading, heat dissipation, and structural stiffness in support of an adjacent layer of the satellite 104. In some implementations, one or more sublayers in the multiple sublayers 137 can be configured to deliver power to components and/or layers of the satellite 104.

Figure 1C:
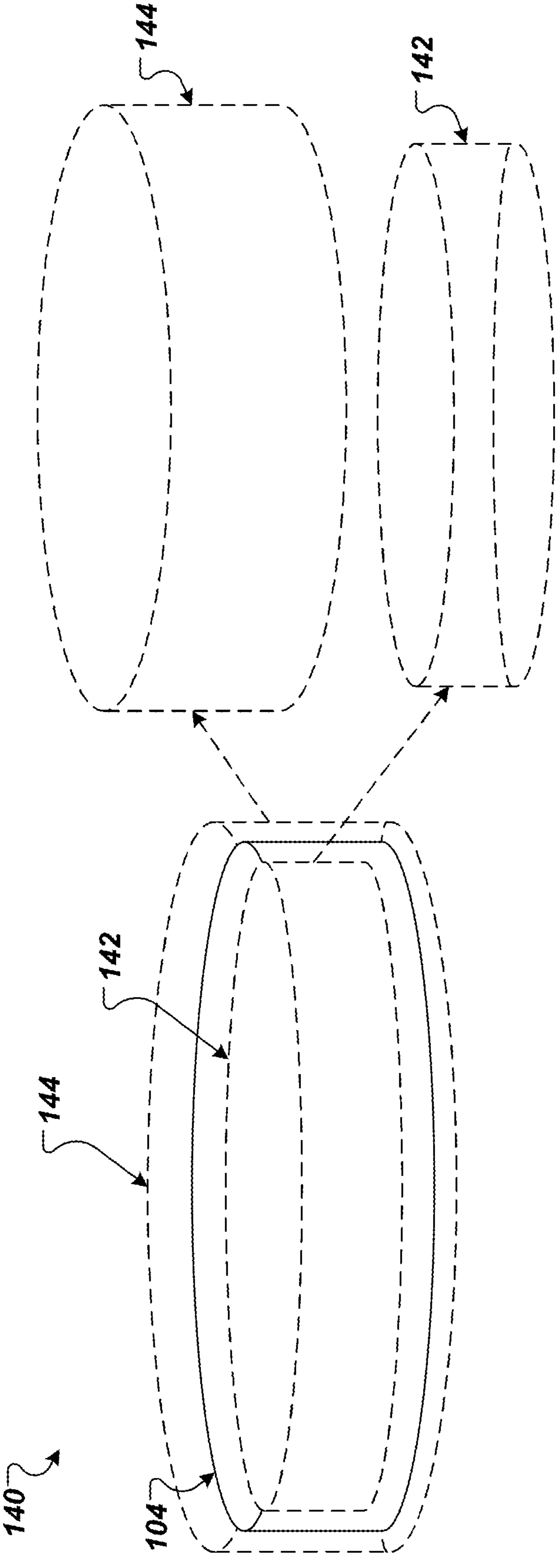
FIG. 1C shows an example frame and exoskeleton for the AI satellite module of FIG. 1A.

FIG. 1C shows a front view 140 of the AI satellite 104 of FIGS. 1A and 1B. The front view 140 shows the satellite 104 optionally including a frame 142 and an exoskeleton 144, both indicated in FIG. 1C by dashed lines. The frame 142 can be configured as a support structure for any of the layers for the satellite 104. For example, the frame 142 can be configured to provide structural support for solar panel layer 132, particularly in cases where the solar panel layer 132 includes a thin layer of photovoltaic diodes and/or substrate material. Although the front view 140 shows the satellite 104 as containing the frame 142, the frame can be approximately the same size as the satellite 104 to enclose the layers.

The front view 140 also shows the exoskeleton 144, which can be coupled to the frame 142 for the satellite 104. The exoskeleton 144 can be configured to withstand stresses and forces on the module, and can be made up of composite material, carbon fiber, metal, or some combination thereof. For example, the exoskeleton 144 can be configured to withstand lateral accelerations and axial accelerations during launch. The lateral and axial accelerations can be represented as a multiplicative factor of gravity such as six times the force of gravity.

The exoskeleton 144 can be an extension of the additional layer 135*a*/135*b*, e.g., substrate layer 135, and/or support structure of the frame 142. In some cases, the exoskeleton 144 is a carbon-fiber exoskeleton that has physical properties for withstanding certain forces and stresses that are applied to the satellite module. For example, the exoskeleton 144 can have vibration damping properties that enable the exoskeleton 144 to withstand stresses on the satellite 104 when the satellite 104 is launched into orbit. The vibration damping properties also enable the exoskeleton 144 to withstand stresses or forces that might occur when the satellite 104 is maintaining a particular orbit, experiencing space weather events, transitioning between two different orbit types, or a combination of these.

The exoskeleton 144 can provide additional structural rigidity and support for when the satellite 104 is launched into orbit. For example, the structural rigidity provided by the exoskeleton 144 can be additional to the structural rigidity and support provided by the frame 142. As another example, the exoskeleton 144 can be configured to withstand forces applied to the exoskeleton 144 (or satellite 104) as the satellite 104 moves along a particular type of orbit, or transitions between different types of orbits. By providing structural support, the exoskeleton 144 can aid the satellite 104 in maintaining at least its target orientation, position, and acceleration. In doing so, the satellite 104 can leverage the exoskeleton 144 to maximize light energy collection, which can also include maximizing the amount of electrical power generated from conversion of the collected light energy.

Figure 1D:
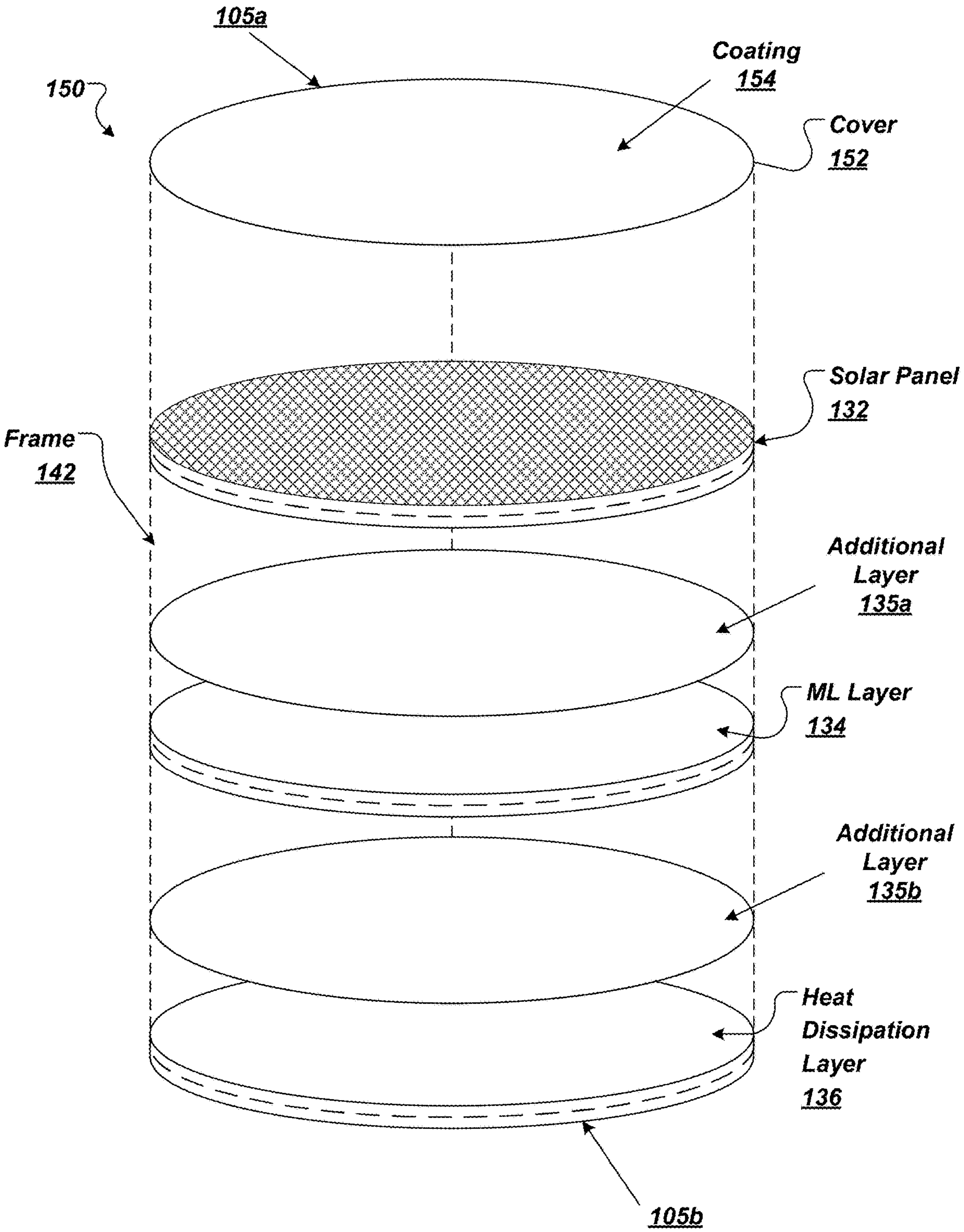
FIG. 1D shows an exploded view of the AI satellite module of FIG. 1A.

FIG. 1D shows an exploded view 150 of the AI satellite 104 of FIG. 1A. The exploded view 150 shows an example arrangement of the different layers of the satellite 104. From the top of the page to the bottom of the page of FIG. 1D, the exploded view 150 shows the solar panel layer 132 coupled to the ML hardware layer 134, which is further coupled to the heat dissipation layer 136. The exploded view 150 also shows an expansion of the frame 142 of FIG. 1C to illustrate the frame being configured to contain the components of the satellite 104. This configuration of frame 142 is indicated at least by the dashed line at the periphery of the layers 132, 134, 136.

The exploded view 150 also shows a cover 152 that can be arranged on top of the solar panel layer 132, and the cover 152 can include a coating 154. For example, the cover 152 can be arranged or positioned at the first side of the solar panel layer 132, and adjacent to an array of solar cells or photodiodes of the solar panel layer 132. In some implementations, the cover 152 is a filter layer (e.g., a panel) that is adjacent to a first side (e.g., atop surface) of the solar panel layer 132. The cover 152 can be a transparent, glass IR cut-off filter, but can also be made up of other materials and filter other wavelengths. The filter layer may be formed from glass that is substantially transparent to radiation with visible wavelengths, while effectively preventing the transmission of radiation with longer-wavelengths (i.e., in the IR range).

For example, the cover 152 can be configured to filter certain wavelengths of light or electromagnetic (E M) radiation that correspond to particular portions of the electromagnetic spectrum. In some cases, the cover 152 can be configured to filter or block certain wavelengths of EM radiation from being received at the first side of the solar panel layer 132. The coating 154 for the cover 152 can be an anti-reflective coating that is used to reduce a likelihood of reflecting or refracting light energy away from the solar panel layer 132 of satellite 104. Thus, the anti-reflective coating 154 can increase light energy collection at the solar panel layer 132, which allows for an increased amount of received light to be converted into electrical energy. In some implementations, the layers of the satellite 104 can be formed into a single wafer and can optionally include coatings, e.g., anti-reflective coating.

The exploded view 150 also shows an additional layer **135*a* interposed between the solar panel layer 132 and the ML hardware layer 134. As described in reference to FIG. 1B above, the additional layer 135*a* can be a thin-film metal/composite substrate layer and may be referred to as a thin film 135*a*. A s described above, the thin film 135*a* can be a substrate of metal and composite materials. The thin film 135*a* can provide structural support and/or thickness between the solar panel layer 132 and the ML hardware layer 134. For example, the thin film 135*a* can provide additional mechanical strength and durability for the satellite 104, and can reduce or dampen vibrations from the environment 100**.

The addition of the thin film substrate layer **135*a* can also provide improved thermal spreading between the solar panel layer 132 and the ML hardware layer 134. In this way, the thin film 135*a* can mitigate or prevent localized overheating in one or more areas of the ML hardware layer 134. One or more thin films 135*a* can be integrated into a satellite 104 at particular locations along the layer stack of view 150 to achieve a more uniform heat distribution at those locations. The exploded view 150 also shows an additional layer 135*b* interposed between the ML hardware layer 134 and the heat dissipation layer 136. The additional layer 135*b* can also be a layer of substrate for improved thermal spreading and radiation for the ML hardware layer 134**.

In some implementations, the satellite 104 includes multiple additional layers **135*a*, 135*b* that each correspond to a particular attribute or function of a satellite 104. For example, the satellite 104 can include a first additional layer 135*a* that is a 1-millimeter (mm) beryllium sheet configured as a substrate of the solar panel layer 132 that provides structural support to the solar panel. Other materials may also be used to construct this first additional layer 135*a*** or solar panel substrate. For example, this substrate layer can be a stiff-but-lightweight honeycomb structure composed of aluminum, carbon fiber, or both. In some implementations, the selected material has certain isothermal properties that provide a threshold measure of thermal stability suitable for optical interfaces.

The satellite 104 can also include a second additional layer **135*a* configured as a radiation shield and heat spreader for a TPU, GPU, or neural processor of the ML hardware layer 134. For example, the second additional layer 135*a* can be a 60×60×40 mm copper layer. Other dimensions and materials can be used to implement this second additional layer 135*a*. In some implementations, the satellite 104 includes additional layers 135*a*, 135*b* that integrate optical intersatellite links for intersatellite communication and one or more thrusters (e.g., ion thrusters) for maneuvering the satellite 104. These are described in more detail below with reference to FIGS. 3A and 3**B.

Figure 1E:
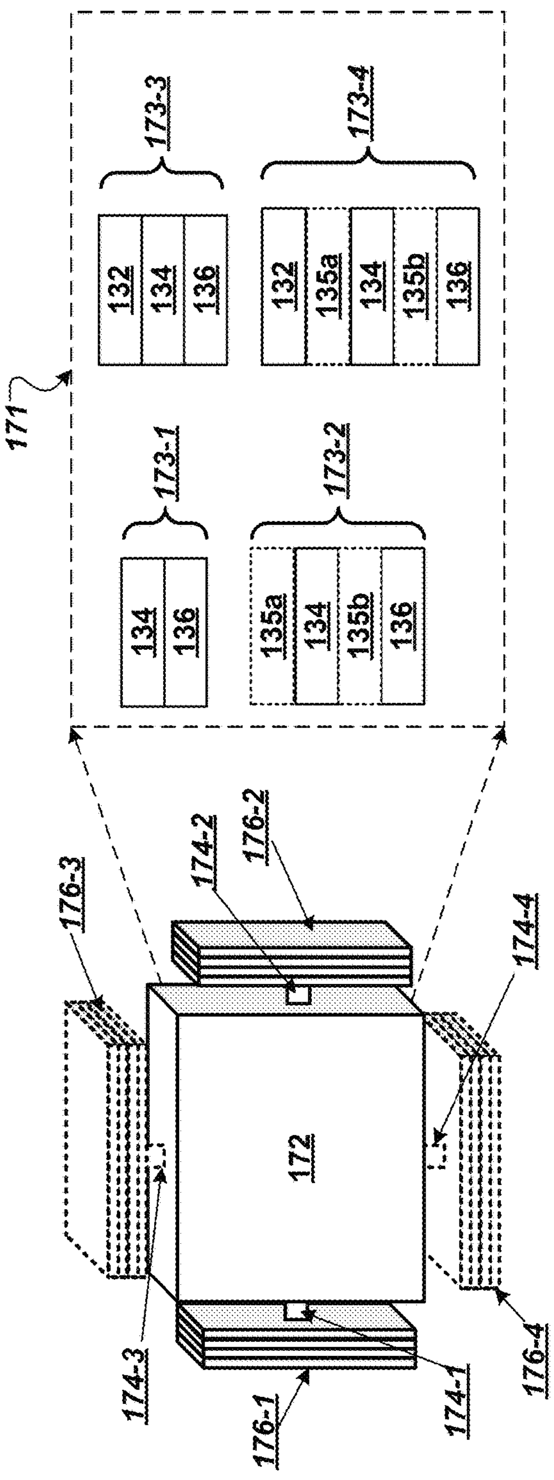
FIG. 1E is a diagram of another example AI satellite module.

FIG. 1E is a diagram of another example AI satellite module 170, also referred to as "satellite 170." The satellite 170 includes a central satellite bus 172 having an integrated design where the ML hardware layer 134 and the heat dissipation layer 136 are part of the same structure. In contrast to the example design depicted in FIGS. 1A through 1D, the example design depicted in FIG. 1E includes deployable solar panel layers, e.g., solar panel layer 132, as coupled structures to the central satellite bus 172, e.g., additional solar panel layers 132 being deployable and separate from the central satellite bus 172. The coupled solar panel layers for the satellite 170 are depicted as deployable satellite arrays 176-1 through 176-4 (collectively referred to as "deployable satellite arrays 176") protruding outward from the central satellite bus 172. Each deployable satellite array of the deployable satellite arrays 176 can be a solar panel layer 132, and thus each array includes solar cells for collecting solar energy and converting to electrical power. Each deployable satellite array can be coupled to the central satellite bus 172 by a respective deployment mechanism.

For example, a first deployable satellite array 176-1 can be connected to the central satellite bus 172 by a first deployment mechanism 174-1. A second deployable satellite array 176-2 can be connected to the central satellite bus 172 by a second deployment mechanism 174-2. The central satellite bus 172 can configure a deployment mechanism to control operation of the deployable satellite array using the deployment mechanism connected to the central satellite bus 172. Configuring a deployment mechanism can include applying control signals to extend the deployable solar array, e.g., outward and away from the central satellite bus 172. In this way, the solar cells in the deployable solar array can be exposed to solar energy in the extraterrestrial environment, e.g., for collecting and converting said solar energy. Configuring the deployment mechanism can also include rotating the deployment mechanism to rotate an angle of orientation of the deployable solar array, as described in reference to FIG. 1F below.

The central satellite bus 172 includes an integrated body for the satellite 170 that includes the ML hardware layer 134, the heat dissipation layer 136, and can optionally include related propulsion, communication, and control subsystems. For example, callout 171 shows a first example 173-1 of the central satellite bus 172 including the ML hardware layer 134 and the heat dissipation layer 136, similar to the arrangement depicted in FIG. 1B but absent the solar panel layer 132. The callout 171 shows a second example 173-2 of the central satellite bus 172 including the ML hardware layer 134, the heat dissipation layer 136, and one or both of the additional layers 135*a* and 135*b*, e.g., also similar to the arrangement depicted in FIG. 1B but absent the solar panel layer 132. The callout 171 shows a third example 173-3 of the central satellite bus 172 including the solar panel layer 132, the ML hardware layer 134 and the heat dissipation layer 136, similar to the arrangement depicted in FIG. 1B. The callout 171 shows a fourth example 173-4 of the central satellite bus 172 including the solar panel layer 132, the ML hardware layer 134, the heat dissipation layer 136, and one or both of the additional layers 135*a* and 135*b*, e.g., also similar to the arrangement depicted in FIG. 1B.

The satellite 170 can include any number of deployable satellite arrays and a corresponding number of deployment mechanisms 174 to configure said deployable satellite arrays 176. For example, the satellite 170 can optionally include a third deployable satellite array 176-3 connected to the central satellite bus 172 by a third deployment mechanism 174-3 and a fourth deployable satellite array 176-4 connected to the central satellite bus 172 by a fourth deployment mechanism 174-4.

Figure 1F:
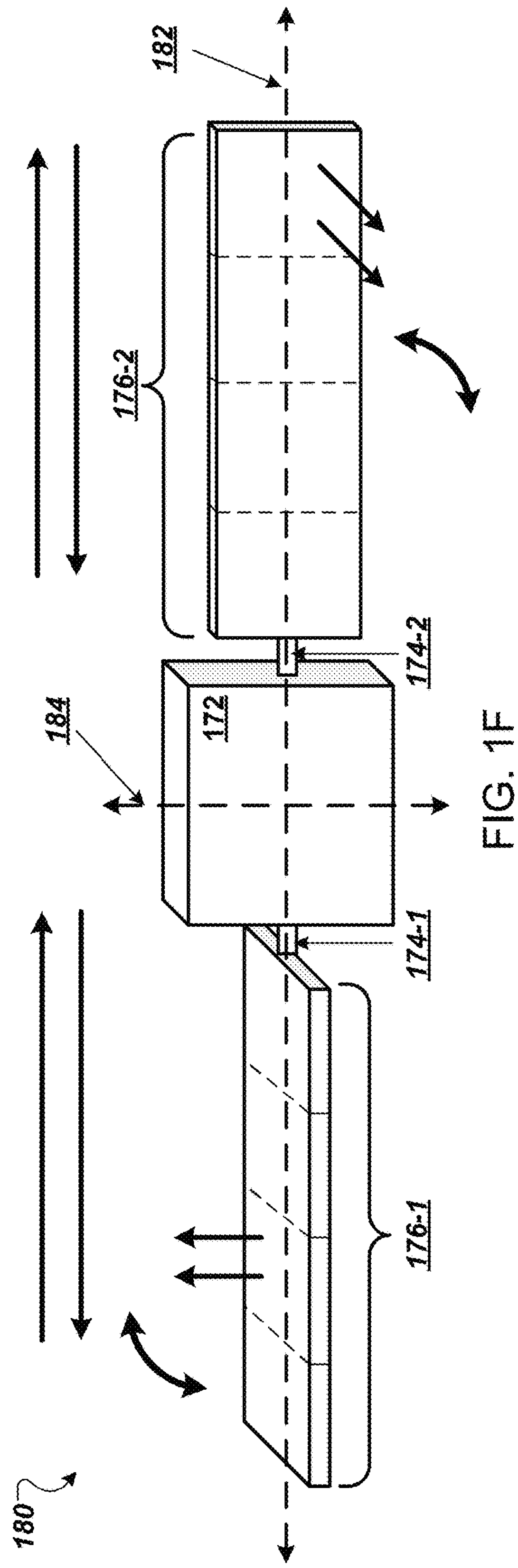
FIG. 1F is another diagram of the example AI satellite module of FIG. 1E.

FIG. 1F is another diagram of the example AI satellite module 170 of FIG. 1E. The diagram 180 shows the deployable solar arrays 176-1 and 176-2 fully extended outward from the central satellite bus 172. The diagram 180 also depicts an axis 182 to show the direction along which the solar arrays can be extended and retracted, relative to the central satellite bus 172. In instances where the central satellite bus 172 includes deployable satellite arrays 176 and their associated deployment mechanisms 174 on a different surface of the central satellite bus 172, e.g., deployable satellite arrays 176-3 and 176-4, the central satellite bus 172 can configure the deployment mechanisms 174 to extend or retract along an axis 184, e.g., depicted as substantially perpendicular to axis 182. FIG. 1F also shows dashed lines for each of the deployable solar arrays 176-1 and 176-2 to indicate that the solar arrays are foldable. In this way, the satellite 170 can be launched into orbit and perform any maneuvers while the deployable solar arrays 176 are in a fully folded and retracted position.

The satellite 170 can deploy the deployable solar arrays 176 by extending and unfolding the solar arrays, e.g., upon achieving a target orbit, position, etc. The satellite 170 can include a control subsystem, such as a subsystem described in reference to FIGS. 1B and 1D above. The control subsystem can determine control adjustments, generate control signals corresponding to the adjustment, and apply the control signals to adjust operation of the deployment mechanisms 174. Adjustments can include folding or unfolding the deployable solar arrays 176 to retract or extend, respectively, the deployable solar arrays 176. Another adjustment of the deployable solar arrays 176 can include rotating the deployable solar array about an axis. For example, FIG. 1F depicts a rotation of deployable solar array 176-1 about the axis 182 to orient a top surface of the deployable solar array 176-1 in a target direction. Said target direction of a deployable solar array can be a different direction than another deployable solar array of the satellite 170, e.g., the deployable solar array 176-1 is oriented in an upward direction whereas the deployable solar array 176-2 is oriented in a direction substantially perpendicular to the upward direction.

Figure 1G:
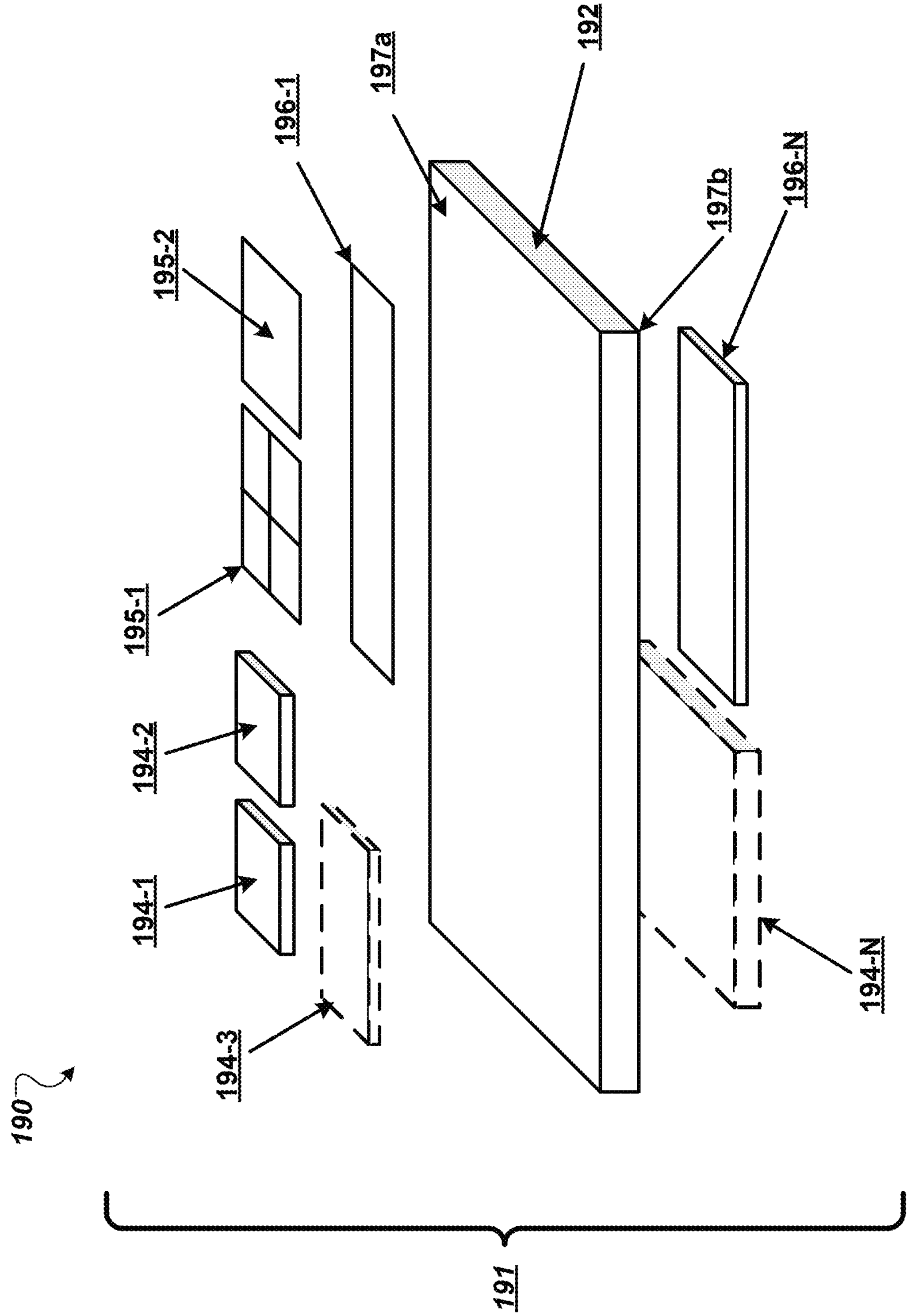
FIG. 1G is a diagram of another example AI satellite module.

FIG. 1G is a diagram of another example AI satellite module 191, also referred to as "satellite 191." FIG. 1G depicts an exploded view 190 of satellite 191 assembled out of multiple compute dies bonded to a layered substrate that contains local communications, power distribution, heat distribution/dissipation, and solar layers. The satellite 191 includes a layered substrate 192 and a number of compute dies 194-1 through 194-N(collectively "compute dies 194"), which can each include a number of machine learning hardware accelerators. For example, the compute dies 194-1, 194-2, and 194-3 are bonded to a top surface 197*a* of the layered substrate 192 and a compute die 194-N is bonded to a bottom surface 197*b* of layered substrate 192, the bottom surface 197*b* opposite the top surface 197*a*. A though view 190 depicts the satellite 191 having four compute dies, any number of compute dies can be attached, e.g., by bonding, to the layered substrate 192.

The layered substrate 192 can be a semiconductor substrate formed by depositing multiple layers, e.g., thin layers of material, onto a base substrate. The layered substrate 192 can include semiconductor material, superconductor materials, insulators, conductors, or some combination thereof. The compute dies 194 can be bonded, e.g., attached, to the layered substrate 192 using different bonding techniques, such as direct bonding, adhesive bonding, anodic bonding, eutectic bonding, among other types of bonding. The compute dies 194 can be part of the ML hardware layer 134, as described in reference to FIGS. 1A, 1B, and 1D above.

With respect to the top surface 197*a*, components of the satellite 191 other than the illustrated compute dies 194-1, 194-2, and 194-3 can be part of and/or mounted to the top surface 197*a* of the layered substrate 192, e.g., in addition to or instead of the compute dies 194-1 through 194-3. For example, components of the solar panel layer 132 described in reference to FIGS. 1A, 1B, and 1D above, such as solar cells, panels, and other types of photovoltaic devices, can part of and/or mounted to the top surface 197*a* of the layered substrate 192. The exploded view 190 depicts an array of solar cells 195-1 and a solar panel 195-2 located at the top surface 197*a* of the layered substrate 192. In another example, components of the heat dissipation layer 136 can be part of and/or mounted to the top surface 197*a*, such as heatsinks, heat pipes, and other types of heat dissipating/radiating structures. For example, a heatsink structure 196-1 of the heat dissipation layer 136 can be mounted to, or part of the top surface 197*a* of the satellite 191.

Similarly, components of one or more layers for the satellite 191, e.g., the solar panel layer 132, the ML hardware layer 134, and the heat dissipation layer 136, can be part of and/or mounted to the bottom surface 197*b* of the satellite 191. For example, the exploded view 190 depicts the compute dies 194-N and a heatsink structure 196-N as part of and/or mounted to the bottom surface 197*b*. Any number of components can be mounted to or part of the layered substrate 192.

Referring to the layered substrate 192, any of the components, subsystems, and systems for control, communications, e.g., such as the subsystems described in reference to FIGS. 1B, 1D, 2A, 2B, can be part of the layered substrate 192. For instance, the layered substrate 192 can include a combination of solar cells, e.g., photoelectric devices from the solar panel layer 132, and heat dissipation elements, e.g., such as radiators, heat pipes, and other types of heat radiating components from the heat dissipation layer 136. In this way, the top surface 197*a* can have regions of solar cells, such as solar cells 195-1 and solar panel 195-2, intermixed with radiating surfaces, such as the heatsink structure 196-1, for heat dissipation. The compute dies 194-1-194-3 from the ML hardware layer can be intermixed at the top surface 197*a* with the components of the solar layer and the heat dissipation layer, as well as circuit components for power delivery, control, communications, etc. The compute dies can include radiation hardening, copper shielding, and/or other types of material to reduce the likelihood of radiation damage to the ML hardware accelerators and related circuitry. Intermixing heat distribution components and solar panel component scan be desirable, as some angles, trajectories, orbits, etc. relative to a solar source can receive substantial amounts of solar exposure. By intermixing heat distribution components with solar panel components, the heat dissipation components, e.g., heatsink structure 196-1, of the satellite 191 can distribute excess heat for a solar-facing side of the satellite, e.g., the top surface 197*a*, while the solar panel components, e.g., solar cells 195-1 and solar panel 195-2, provide electrical power to components of the ML hardware layer, e.g., the compute dies 194-1-194-N.

Although FIG. 1G depicts the compute dies 194-1 through 194-3 bonded to a top surface 197*a* of the layered substrate 192, additional compute dies such as compute die 194-N can be bonded to a second side of the layered substrate 192 opposite the top surface 197*a*. For instance, FIG. 1G depicts the compute die 194-N bonded, (e.g., attached, mounted) to the bottom surface 197*b* of the layered substrate 192, e.g., a side of the layered substrate opposite to where the compute dies 194-1 through 194-3 are bonded. Although FIG. 1G depicts intermixed components from solar panel layer 132 and the heat dissipation layer 136 at the top surface 197*a* for the satellite 191, components from the solar panel layer 132, ML hardware layer 134, and heat dissipation layer 136, or some combination thereof, can also be intermixed at the bottom surface 197*b*. For example, the bottom surface 197*b* of the layered substrate 192 can include a mix of components for communications, control, power distribution, heat distribution/dissipation, machine learning hardware computations, and solar energy conversion.

Figure 2A:
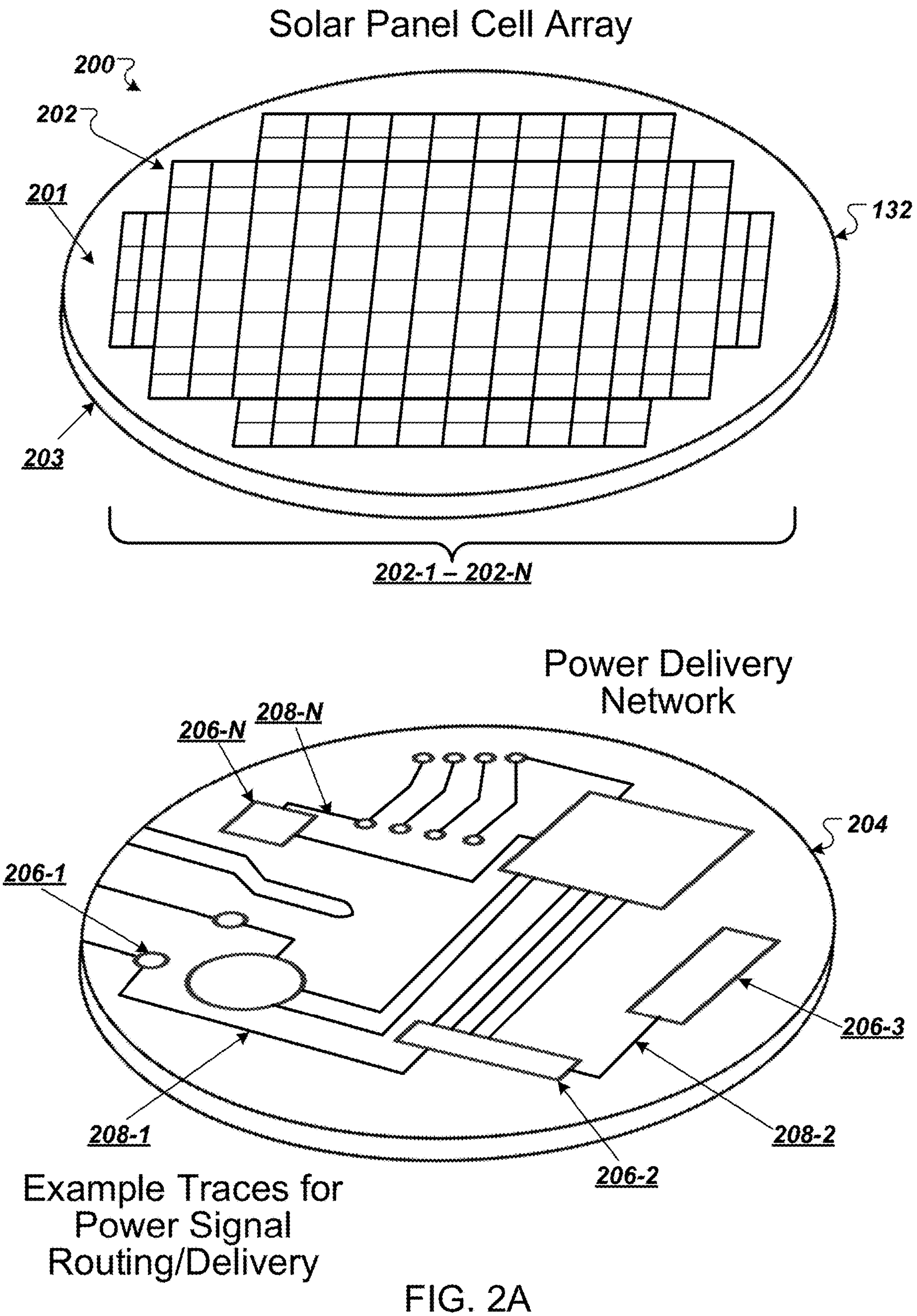
FIG. 2A shows a perspective view of a solar panel layer and power delivery network for the AI satellite module.

FIG. 2A shows a perspective view 200 of an example solar panel layer 132 and power delivery network 204 for the AI satellite 104. The perspective view 200 shows the solar panel layer 132 having a first side 201, which can also be the first side 105*a* of satellite 104, e.g., top surface 105*a*. The perspective view 200 also shows the solar panel layer 132 having a second side 203 that is opposite of the first side 201. For example, the second side 203 can be a bottom surface of the solar panel layer 132.

The first side 201 of the solar panel layer 132 includes solar cells 202-1 through 202-N(collectively "solar cells 202.") Although FIG. 2A depicts the solar cells 202 covering a particular surface area of the first side 201 of the solar panel layer 132, the solar cells 202 can encompass an entirety of the first side 201. The solar cells 202 can be arranged in an array of any shape on the first surface 201. In some implementations, the solar cells 202 are disposed at the solar panel layer 132 by way of embedding or integration at the first side 201. The solar cells 202 can be formed or constructed using flexible photoelectric materials. In some implementations, the solar cells 202 are formed using a thin fragile film that is deposited onto a thin structure for support.

Each of the solar cells 202 can include photodiodes, detectors, and other types of photoelectric devices to convert light energy into electric power. In some implementations, the photodetectors for a solar cell, e.g., solar cell 202-1, are configured to capture light energy represented by electromagnetic waves that have a particular wavelength or range of wavelengths within certain bands of the electromagnetic spectrum. For example, any of the solar cells 202 can be one or more of thermophotovoltaic cells (e.g., to convert infrared radiation), rectennas (e.g., rectifying antennas for converting IR or microwave radiation), thermoelectric generators (e.g., to convert heat), or quantum dot photodetectors. The quantum dot photodetectors can be tunable photodetectors configured to generate electric power by converting electromagnetic waves/radiation from different bands of the electromagnetic spectrum.

The perspective view 200 depicted in FIG. 2A also shows a power delivery network 204. The power delivery network 204 can be implemented in the satellite 104 as a network of conductive traces that are integrated, for example, at the second side 203 of the solar panel layer 132. The power delivery network 204 can have different groupings or sets of conductive traces that represent different portions or sub-networks of the power delivery network 204. For example, a first portion of the conductive traces can be integrated at the second side 203 of the solar panel layer 132, whereas a second, different portion of the conductive traces can be integrated at a different layer or region of the satellite 104.

In some implementations, the power delivery network 204 can be a separate layer from the solar panel layer 132. For example, the power delivery network 204 can be a power delivery layer implemented using one or more of the additional layer 135*a*, the additional layer 135*b*, or both the additional layer 135*a* and 135*b*. The power delivery network 204 can include (or connect) a number of power electronic components 206-1 through 206-N(collectively "power electronic components 206") of the satellite 104. The power delivery network 204 also includes a number of electrical traces 208-1 through 208-N(collectively "electrical traces 208") that distribute power to the power electronic components 206.

A n electrical trace in the power delivery network 204 can be configured to connect two or more power electronic components 206. Examples of electronic components 206 can include regulators (e.g., switching regulators), power distribution networks, de-coupling capacitors, power gating switches, current mirrors, inductors, resistance networks, or converters (e.g., analog-to-digital converters). The various computing, storage, and data processing resources of the ML hardware layer 134 can also represent examples of power electronic components 206 of the satellite 104.

As an example, the electrical trace 208-1 is shown connecting electrical components 206-1 and 206-2, and the electrical trace 208-2 is shown connecting electrical components 206-2 and 206-3. The power electronic components 206 and/or the electrical traces 208 can be at least partially disposed in the surface of the power delivery network 204. In general, the power delivery network 204 can be in signal communication with any number of electrical components of the satellite 104.

The power delivery network 204 includes power signal traces that deliver or distribute power throughout the satellite 104. For example, traces of the power delivery network 204 can deliver electric power from the solar panel layer 132 to an adjacent layer, such as ML hardware layer 134, additional layer 135*a*, or both. Relatedly, the traces of the power delivery network 204 can also deliver electric power from the solar panel layer 132 to any non-adjacent layer of the satellite 104. This is described below with reference to FIG. 2B.

In some implementations, the power delivery network 204 can optionally include cooling elements or thermal conduction attributes/properties that gradually distribute and/or diffuse heat generated by the ML hardware layer 134. For example, these cooling elements and/or thermal conduction properties can reduce the contrast in temperatures between the first side 105*a* of the solar panel layer 132 and at least the ML hardware layer 134.

In some implementations, the power electronic components 206 of the power delivery network 204 include radiation-hardened components to reduce a likelihood of component failure or degraded performance due to certain electromagnetic radiation that create harsh conditions in the extraterrestrial environment 100. For example, the radiation-hardened components can reduce exposure to harmful radiation, e.g., reducing a total ionizing dose experienced by the components. In this way, the satellite 104 can maintain a longer duration of operability and mitigate or prevent risk of failure and degraded performance when components encounter high-energy or ionizing radiation while orbiting celestial body 102.

In some implementations, the power delivery network 204 can include a radiation-hardened logic design to mitigate errors from radiation in the extraterrestrial environment 100. For example, the arrangement of the power electronic components 206 and/or the electrical traces 208 can be any radiation-hardened logic design, such as triple modular redundancy. Triple modular redundancy can involve three identical circuits and a voting system for error correction and dual interlocked memory/storage cells for implementing resilient memory units. In some cases, the radiation-hardened logic design includes applying error detection and correction. For example, the design approach can include applying error correction codes for detecting and fixing bit errors. The approach can also include latch-up hardened designs that can prevent radiation-induced parasitic transistor activation, e.g., radiation causing the transistors in circuitry to inadvertently activate.

In some implementations, the satellite 104 includes electrical wiring between layers for communication of data throughout the satellite 104. For example, the wiring may be used in addition to, or instead of, the electrical traces 208 to transmit and receive compute/workload data for processing by the ML hardware layer 134, and/or satellite bus data for operating subsystems of the satellite 104.

Figure 2B:
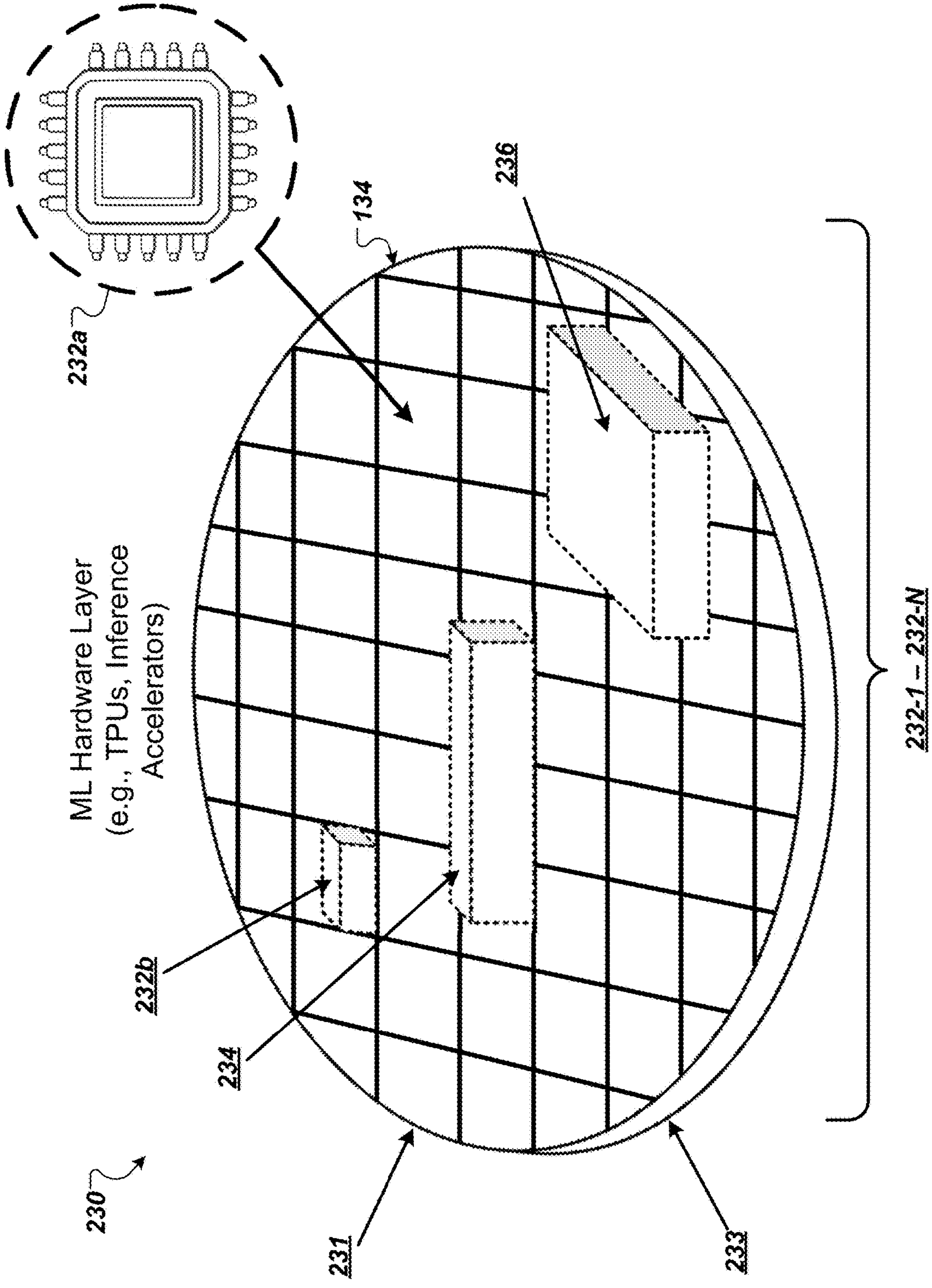
FIG. 2B shows a perspective view of an example machine-learning layer for the AI satellite module.

FIG. 2B shows a perspective view 230 of an example ML hardware layer 134 for the AI satellite 104, as described above in reference to FIGS. 1B and 1D above. As mentioned above, the ML hardware layer 134 can include computational elements such as tensor processing units (TPUs), graphical processing units (GPUs), application-specific integrated circuits (ASICs), central processing units (CPUs), dynamic random-access memory (DRAM), and non-volatile storage.

In the example of FIG. 2B, the ML hardware layer 134 includes a number of ML hardware accelerators 232-1 through 232-N(collectively "ML accelerators 232") for performing ML training and/or inference tasks. The ML accelerators 232 can include special-purpose hardware integrated circuits, such as TPUs, GPUs, tensor streaming processors, neural/tensor cores, neural network processors, or related special-purpose processors that are optimized for dense, large-scale matrix and vector arithmetic for executing AI/ML and neural network computations.

In some implementations, the ML accelerators 232 can be configured to perform computing tasks that apply different types of artificial intelligence techniques, including ML and neural network algorithms. The ML hardware layer 134 can be formed from a substrate, which can include a top surface 231 corresponding to a first side of the substrate and a bottom surface 233 corresponding to a second side of the substrate. For clarity, the second side of the substrate is opposite the first side of the substrate. The ML accelerators 232 can be disposed in a partial thickness of the substrate for the ML hardware layer 134, e.g., embedded in the top surface 231 and/or the bottom surface 233.

In the example of FIG. 2B, the ML accelerators 232 of the ML hardware layer 134 can be one or more tensor processing units (TPUs) that process tensor constructs, such as multi-dimensional arrays, for machine-learning computations. In some implementations, the ML computations performed by the TPUs include executing operations using tensors, such as matrix multiplication using matrices, e.g., a multi-dimensional matrix. The ML accelerators 232 can be formed from the ML hardware layer 134, which can be a substrate such as a semiconductor wafer. For example, the ML hardware layer 134 can be a semiconductor wafer that includes the ML accelerators 232 fabricated as part of the ML hardware layer 134. In some implementations, the ML hardware layer 134 includes a discrete network of integrated circuit chips arranged as a distributed set of ML accelerators 232. A callout 232*a* depicts an example ML accelerator 232 (e.g., TPU) that is formed in the top surface 231 of the ML hardware layer 134.

The ML hardware layer 134 can be a wafer of semiconductor material, and the ML accelerator 232 can be configured to perform certain computing tasks, such as training ML models or executing inference tasks by computing dot products to process ML inputs through layers of a neural network. In an example, the satellite 104 can include an arrangement of 4 ML accelerators 232 (e.g., a 2×2 array of ML accelerators 232) for a satellite 104 with an approximate size of 2 meters by 2 meters, e.g., a square shape. Each ML accelerator 232 may consume approximately ~200-400 Watts of power, which can be supplied by the solar panel layer 132 by converting light energy into electrical power. In some implementations, electrical components such as capacitors and other types of memory devices can be formed (e.g., printed, fabricated) on the wafer for the ML hardware layer 134.

The ML hardware layer 134 can include one or more ML hardware accelerators, each ML hardware accelerator occupying a surface area on a circuit die. The number of ML hardware accelerators can be proportional to a power capacity of the solar panel layer 132, e.g., a number of solar cells in the solar panel layer 132 for converting solar energy (or solar power) to electrical power. As an example, a solar panel layer 132 can have a corresponding solar panel capacity, e.g., 50 kilowatts to 500 kilowatts, based on the number of solar cells and/or amount of photovoltaic material. The ML hardware layer 134 can include hundreds of ML hardware accelerators, each occupying a surface area, e.g., 800 millimeters squared, of a circuit die, e.g., having a diameter of 300 millimeters and a total approximate surface area of 70,000 millimeters squared fora circular wafer shape. In some instances, the ML hardware layer 134 is distributed on a single die from multiple dies, or across different dies from the multiple dies for the satellite module. As described in reference to FIG. 1G above, a satellite module can be assembled from multiple compute dies bonded to a layered substrate, e.g., multiple, integrated circuits dies that are attached, to a layered substrate, e.g., printed circuit board.

In some implementations, the ML hardware layer 134 can be a single semiconductor wafer embedded on a substrate material. In some implementations, the ML hardware layer 134 can include multiple semiconductor wafers embedded on a substrate material. A semiconductor wafer can have a particular diameter associated with a standardized size, such as 300 millimeters in diameter, though semiconductor wafers can be manufactured at substantially larger diameters, such as 2000 millimeters in diameter, compared to the standardized size at 300 millimeters.

The satellite 104 can include batteries and related energy storage devices (e.g., capacitors) for storing electrical energy and/or chemical energy that is converted to electrical energy. The satellite 104 can also include related memory devices to store data in volatile memory, e.g., for on-going computing tasks and/or future computing tasks. By using volatile memory, the satellite 104 can perform computational tasks and/or schedule tasks regardless of the current availability of light for conversion into electrical power, such as during a night-side transit or orbital path with limited exposure to source 110. For example, during non-source facing portions of its orbit, the satellite 104 can temporarily transition to battery power to ensure or maintain a minimum supply of electrical power to continue processing data for an ML training and/or inference task.

The ML accelerators 232 can be configured to perform any type of computing task, such as the types of tasks that would otherwise be performed by a terrestrial datacenter. For example, the ML accelerators 232 can be configured to perform tasks related to software applications, cloud computing, AI and ML tasks, analytics, high-performance computing, and memory back-up and data storage. Other types of computational tasks are also within the scope of this disclosure. FIG. 2B depicts an example arrangement or configuration of ML accelerators 232 at a first side 231 of the ML hardware layer 134. The ML accelerators 232 can be configured, arranged, and/or distributed across a particular surface of the ML hardware layer 134 in any manner based on design preference. Thus, the ML hardware layer 134 can have any arrangement or arrays of ML accelerators 232. For example, the ML hardware layer 134 can have an array of 4, 8, 10, or N accelerators 232. In some implementations, the ML accelerators 232 are arranged in row-column format, e.g., N rows and M columns, where N and M are positive integers.

In some implementations, the ML accelerators 232 can be electrically connected to each other, e.g., in a stacked configuration using one or more interposers. In some implementations, the ML accelerators 232 are integrated or mounted on one or more sides of the ML hardware layer 134. For example, ML accelerator 232*b* is depicted in FIG. 2B as being mounted or integrated at a first (e.g., top) side 231 of the ML hardware layer 134. In some implementations, one or more of the ML accelerators 232 can be mounted or integrated at the second (e.g., bottom) side 233 of the ML hardware layer 134. In some cases, other components and/or subsystems of the satellite 104 can be part of the ML hardware layer 134.

In another example, one or more ML accelerators from the ML accelerators 232 can be a graphics processing unit (GPU) adapted for machine-learning or other computations related to model training or inference processing. In other examples, one or more of the ML accelerators 232 can be a special-purpose integrated hardware circuit such as a hardware accelerator configured to accelerate computations for machine-learning workloads, or a neural network processor configured to implement one or more neural networks (e.g., convolutional neural networks) for various machine-learning models.

In some implementations, other components and/or subsystems of the satellite 104 can be mounted or integrated on the ML hardware layer 134. In the example of FIG. 2B these subsystems and components are indicated by component 234 and subsystem(s) 236. A subsystem 236 can include multiple components, e.g., component 234, configured to perform a particular application or type of mission for the satellite 104. For example, the subsystems 236 can be configured to control the orbit and maneuvering of the satellite 104, communication between components and/or layers of the satellite 104, among other tasks. For example, a subsystem 236 of the satellite 104 can be configured to schedule computing tasks for the ML hardware layer 134 based on available electrical power for the satellite 104. In some implementations, a subsystem 236 of the satellite 104 is configured to manage power distribution and operation of electrical components in a power delivery network of the satellite 104. Further description of the subsystems 236 for an example satellite 104 are described below in reference to FIGS. 2C and 2E.

As another example, the subsystem 236 can include a communication subsystem 236, which is referred alternatively as a communication module. For example, the communication subsystem 236 can include a transmitter and a receiver (e.g., a transceiver) for uplink and downlink communications between the satellite 104 and a terrestrial computing system located on celestial body 102, e.g., a system on Earth. The communication subsystem 236 can be configured for bidirectional data transfer between the satellite 104 and other satellites or ground stations on celestial body 102. For example, the communication subsystem 236 can be configured to transmit data using radio frequencies, optical communication, and other communication techniques. In some implementations, the communication subsystem 236 of satellite 104 is configured to communicate with ground stations on other celestial bodies, such as the Moon or Mars.

The communication subsystem 236 enables the satellite 104 to receive data for processing by the ML hardware layer 134 and to transmit data such as ML outputs generated by the ML hardware layer 134. In some cases, the communication subsystem 236 can be configured to apply encryption and/or error correction techniques to data prior to transmitting the data to a ground station, another satellite 104, or both. The communication subsystem 236 can be configured to transmit and receive data using a particular frequency or frequency bands. For example, the communication subsystem 236 can transmit and receive data in spectrum bands such as infrared, near infra-red, ultra-high frequency, very-high frequency, X-band, S-band, among other portions of the electromagnetic spectrum.

In some implementations, the component 234 can be one or more sensors, e.g., also referred to as "sensor(s) 234." Examples of a sensor from the sensors 234 can include sun sensors to detect the position of the Sun, Earth horizon sensors to detect the Earth's horizon line, apogee of the satellite, and perigee of the satellite. Examples of sensors 234 can also include star trackers to identify stars for attitude control, gyroscopes to measure angular velocity, and magnetometers to collect magnetic field measurements from the environment 100, including Earth's magnetic field. The satellite 104 can also include thermal sensors to measure temperature of the satellite 104, radiation sensors to measure radiation levels, altimeters to determine altitude for the satellite 104, and imaging sensors to track other objects such as satellites, orbital debris, etc. For instance, the imaging sensors can be configured to capture images of the environment 100 and any objects external to the satellite 104 in the environment, including objects within orbit of the celestial object and/or the satellite 104. The satellite 104 can also include spectrometers to collect data related to electromagnetic radiation, such as intensity, wavelength, and an amount of light that is absorbed, reflected, or transmitted.

The sensors 234 can be used by the satellite 104 to collect sensor measurements to detect harmful events, such as events that can affect data collection and/or processing by the satellite. The detection and mitigation of said events can allow improved operability of the satellite by reducing risk of damage, such as to electrical components and memory. For example, the satellite 104 can be configured to mitigate radiation risks based on a total ionizing dose experienced by the satellite 104 in the environment 100. A sensor 234 of the satellite 104 can detect an amount of radiation that can degrade the performance and/or cause failure of the ML accelerators 232. Examples of errors caused by ionizing radiation can include bit flip soft errors, which can result in unintentional changes in data or memory for the ML hardware layer 134. In some cases, the amount of radiation can be associated with a particular high-energy event, although the amount of radiation can be associated with cumulative radiation over a period of time.

The ML hardware layer 134 can include radiation shielding and/or hardening material (e.g., copper, aluminum, nanocomposites, conductive fabrics). For example, the ML hardware layer 134 can include copper shielding to protect electronics in the ML hardware layer 134 (e.g., a TPU) from low-energy particles carried by the radiation in the environment 100, e.g., low-earth orbit. Through radiation hardened components of the ML hardware layer 134, the satellite 104 can reduce the likelihood of bit flip soft errors of computational elements, e.g., the TPU, and related electronics.

The ML hardware layer 134 can be configured to apply different mitigation strategies to reduce radiation-induced bit flip errors, such as error-correcting code memory, checkpoints with rollbacks, fault tolerant computing, etc. In some implementations, the satellite 104 can be configured to detect a radiation event (e.g., a solar storm flying over the Earth's poles) and transition to a back-up operational mode. The satellite 104 can be configured to duplicate data for the ML hardware layer 134 in memory (e.g., storage devices) prior to transition to back-up operational mode and cease activity of the computational elements, e.g., ML accelerators 232, in the ML hardware layer 134. The module 134 can transition out of the back-up operational mode, run error checking for one or more subsystems 236, and/or continue computational processing by the ML accelerators.

In some examples, alternatively or in addition to the subsystems 236, the ML accelerators 232 can be configured to control the satellite 104, e.g., maneuvering, orbiting, communications, power delivery, electric power generation, and heat dissipation.

In another example, the ML accelerators 232 can occupy a relatively small surface area of the ML hardware layer 134 relative to the surface area of solar cells 202 of the solar panel layer 132. For example, the ML accelerator 232 can occupy approximately hundreds of square-millimeters of surface area for each square meter of the solar panel. For example, a 20 millimeter by 20 millimeter semiconductor of ML accelerators 232 can be shielded with copper shielding of approximately 10 millimeters in thickness to enclose the ML accelerators 232. In this way, the ML accelerators 232 and any related circuitry, e.g., the power delivery network 204, can be protected from ionizing radiation while reducing overall weight of the satellite 104, e.g., using approximately 286 grams of copper shielding. As another example, the copper shielding can be a greater thickness, e.g., a thickness of 20 millimeters of copper shielding for a die with size 20 millimeters by 20 millimeters can weigh approximately 1.3 kilograms.

In some implementations, the copper shielding for components of the satellite 104 can also work as a heat-sink structure and/or heat spreader to dissipate heat from the components. In some implementations, graded-Z shielding can be used to protect components of the satellite 104, by applying a shielding material made up of multiple materials with different atomic numbers (Z-values), e.g., attenuate and absorb radiation.

In some implementations, the ML layer 134 and solar panel layer 132 can be formed from the same layer. For example, a single layer can include a non-overlapping arrangement of solar cells 202 and ML accelerators 232 distributed throughout the surface of the same layer. In some implementations, the ML accelerators 232 of the ML layer 134 include radiation-hardened shielding to reduce a likelihood of radiation-induced error in the data or related computing processing by the satellite 104.

Although not illustrated in FIG. 2B, the ML layer 134 can include electrical traces 208 and power electronic components 206, e.g., similar to the power delivery network 204 described in reference to FIG. 2A above. For example, the ML layer 134 can include electrical traces 208 to provide connectivity between multiple accelerators from among the ML accelerators 232. The electrical traces can provide a conduit for communication pathways to control the satellite 104 but also for transmitting and receiving computational data for the ML accelerators. For example, the communication pathway can allow for control signals to traverse throughout the module 104, e.g., to provide attitude control and other types of maneuvers. The control signals can be an example of satellite bus data, which include any data used for controlling the module 104, e.g., data for power delivery, propulsion, thermal control, and communication. The communication pathways can allow for the compute data to traverse throughout module 104, such as for transmitting inputs and outputs of AI/ML tasks for training a model, performing inference tasks, etc. In some cases, the communication pathways can be configured for communication between two ML accelerators, ML accelerator(s) and inter-satellite communication devices of the satellite 104, and other types of components of the satellite 104.

Referring to the sublayers 137 described in reference to FIG. 1B above, in some implementations, at least a portion of the power delivery network 204 can be disposed at a first sublayer of the sublayers 137, e.g., a sublayer 137-1. A second sublayer from the sublayers 137 can include at least a subset of the ML accelerators 232 being disposed at the second sublayer, e.g., a sublayer 137-2.

Figure 2C:
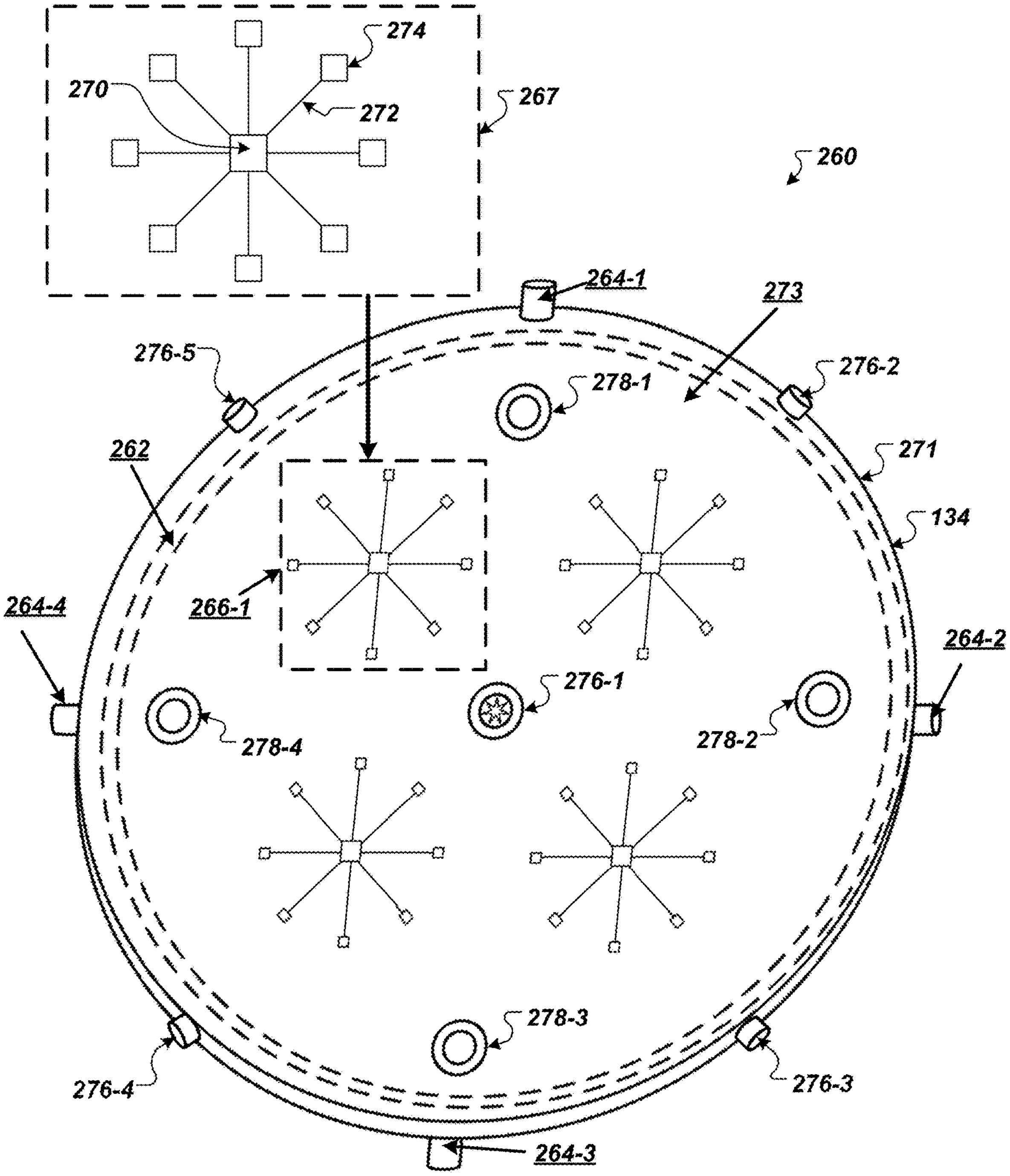
FIG. 2C shows a perspective view of an example propulsion layer of the AI satellite module.

FIG. 2C shows a perspective view 260 of a propulsion layer 271 of the AI satellite module. The propulsion layer 271 in FIG. 2C is depicted as having a surface 273. In some implementations, the propulsion layer 271 is part of the ML hardware layer 134 and the surface 273 can be the bottom surface 233 depicted in FIG. 2B. For example, components of the propulsion layer 271 of the bottom surface 233 of the ML hardware layer 134 that can be configured as subsystems for control, maneuver, and propulsion for the satellite 104. However, the propulsion layer depicted in FIG. 2C can also be an example of a different layer of the satellite 104, such as an additional layer 135*a* or 135*b* described in reference to FIG. 1B above, e.g., instead of being part of the ML hardware layer 134. The propulsion layer 271 can also be part of a control system or subsystem, e.g., subsystem 236 described in reference to FIG. 2B above. As described in reference to FIG. 2B, the ML hardware layer 134 can also be configured to control the propulsion layer and in some cases, can be adjacent to or part of the propulsion layer 271. In some implementations, the components depicted in the propulsion layer 271 may instead be part of or mounted onto a different layer of the satellite 104 instead of the ML hardware layer 134, e.g., an additional layer 135*a* or 135*b*.

The perspective view 260 shows the propulsion layer 271 including a magnetorquer coil 262 to control and maneuver the satellite 104. The magnetorquer coil 262 is illustrated in FIG. 2C as a pair of circular dashed lines, e.g., substantially concentric and parallel to a periphery of the AI satellite module. The magnetorquer coil 262 can include one or more coils of wire wrapped around a core, e.g., ferromagnetic or air-core, and can be configured by the propulsion layer 271 to achieve a target orientation, position, attitude, etc., for the satellite 104. The magnetorquer coil 262 can generate torque through magnetic interactions with any magnetic field, e.g., the Earth's magnetic field, other magnetic fields in the extraterrestrial environment, the Sun's magnetic field, and magnetic fields associated with other satellites. The magnetorquer coil 262 can generate a magnetic dipole from a current passing through the coils, e.g., a current generated from the solar power collected and converted into electrical power by the solar panel layer 132.

The dipole for the magnetorquer coil 262 can interact with any magnetic fields in the environment 100 to generate torque, thereby allowing for the satellite 104 to adjust any angles for maneuvering. For example, the satellite 104 can adjust its maneuvering angles to follow a target orbit or to achieve a target orientation that allows for improved collection and conversion of solar energy into electrical power. For example, the propulsion layer 271 can apply an amount of current that achieves a target amount of torque that results in a rotation that achieves a target orientation for the satellite 104. The magnetorquer coil 262 can adjust attitude angles (e.g., roll, pitch, yaw); orbital angles (e.g., inclination, right ascension of an ascending node of the satellite, argument of perigee, true anomaly); and ground coverage angles (e.g., elevation, azimuth, field of view). In some implementations, control can include adjusting motion of the satellite 104 along an axis, e.g., surge, swag, and heave.

The propulsion layer 271 also includes thrusters 276-1 through 276-5 (collectively "thrusters 276"). The thrusters 276 can allow for attitude control and orbit adjustment, e.g., in addition to or instead of magnetorquer coil 262. FIG. 2C depicts the first thruster 276-1 at a central location of the surface 273, e.g., formed into the propulsion layer 271, and the remaining thrusters 276-2 through 276-5 located on a periphery of the propulsion layer 271, e.g., protruding outward from the periphery of the propulsion layer 271. The first thruster 276-1 may be part of or on an external surface 273 of the satellite 104, compared to the thrusters 276-2 through 276-5 located on the periphery of the external surface 273 of the satellite 104.

The thrusters 276-2 through 276-5 can generate a force along a direction substantially parallel to the surface 273 of the propulsion layer 271. Although FIG. 2C depicts a single thruster 276-1 at the central location of the surface 273, the propulsion layer 271 can include any number of thrusters at any position located on the surface 273. Similarly, the propulsion layer 271 can include any number of thrusters on the periphery of the propulsion layer 271. Examples of a thruster can include ion thrusters and Hall effect thrusters, among other types of propellant-free thrusters.

The perspective view 260 of the propulsion layer 271 also shows a compute subsystem 266-1, which can further include one or more ML accelerators 232, radiation shielding, and heat spreaders. Although FIG. 2C depicts the propulsion layer 271 of the satellite 104 having a 2 by 2 arrangement of 4 compute subsystems 266-1, the satellite 104 can include any number of compute subsystems in any arrangement, e.g., a single compute subsystem 266-1, two compute subsystems 266-1 and 266-2, etc. An example compute subsystem 266-1 is shown in a callout 267 depicting a radiation shielded ML accelerator 270, e.g., an ML accelerator 232 with radiation shielding material, e.g., copper. The radiation shielded ML accelerator 270 can also include material for radiation hardening to reduce the likelihood of radiation damaging the ML accelerator 270.

OQ The callout 267 also shows the radiation shielded ML accelerator 270 being connected to a heat spreader 274 by a heat pipe 272. The callout 267 depicts the compute subsystem 266-1 having an example arrangement of heat pipes and spreaders, with eight heat spreaders 274 that are substantially equidistant from radiation shielded ML accelerator 270 and each heat spreader 274 being coupled to the radiation shielded ML accelerator 270 by a respective heat pipe 272. A heat pipe 272 transfers heat generated by the radiation shielded ML accelerator 270 away from the radiation shielded ML accelerator 270 and towards the heat spreader 274. The heat pipe 272 can transfer heat using a phase change process, e.g., transporting and spreading the heat over a larger surface area compared to the radiation shielded ML accelerator 270, thereby cooling the radiation shielded ML accelerator 270. The heat spreader 274 can include a material for dissipating heat, e.g., a thermally conductive material, to distribute heat from the radiation shielded ML accelerator 270 carried by the heat pipe 272. For example, the heat spreader 274 can allow for the heat to be spread over a larger surface area to further improve cooling for the radiation shielded ML accelerator 270.

In some implementations, the propulsion layer 271 can include reaction wheels 278-1 through 278-4 ("reaction wheels 278") configured to provide control adjustments, e.g., attitude, orbit, and orientation. The reaction wheels 278 can generate a target amount of angular momentum by rotating at a particular speed, which can result in a force that rotates or tilts the satellite 104. In some cases, the reaction wheels 278 can allow for the satellite 104 to turn, e.g., to maintain a particular orientation, change orientations, or align the satellite 104 to allow for improved collection of data, e.g., by capturing sensor measurements, or energy, e.g., by orienting solar cells 202 towards a source of solar energy or refracted energy. In some implementations, a control moment gyroscope (CM G) can be used instead of a reaction wheel, and the CM G may be located at similar positions on the propulsion layer 271 as the reaction wheels 278 depicted in FIG. 2C. For example, the CM Gs 278 can provide larger amounts of torque compared to reaction wheels 278, e.g., from adjusting orientation of a spinning flywheel using gimbaled motors to generate the torque, to control the attitude of the satellite 104.

The propulsion layer 271 can also include optical inter-satellite links 264-1 through 264-4 (collectively "optical inter-satellite links 264" or "optical links 264"). FIG. 2C depicts the four optical links 264-1 through 264-4 protruding outward from the periphery of the propulsion layer 271. The optical links 264 can allow the satellite 104 to communicate with other satellites, e.g., to form a network of ML accelerators. In some implementations, the optical links 264 can be formed in the propulsion layer 271, e.g., in contrast to protruding out of the periphery of the propulsion layer 271.

Each optical link from the optical links 264 can include a respective actuator and lens configuration that allows for the optical link to be adjusted, e.g., orienting the lens of the optical link at a particular angle or configuration that improves connectivity between two or more satellites 104. The actuator for the optical link can allow for the lens to be aimed at an angle to improve a likelihood of being on the same axis as another optical link from a different satellite. The lens for an optical link 264 can have a particular aperture size, e.g., 10 centimeters, and the optical links 264 can further include components such as fiber amplifiers, and ethernet optical transceivers, to increase communication range, speed, etc. Thus, the optical links 264 can be used for free-space communication, e.g., data transmission between multiple satellites 104. In this way, computational loads for model training and/or inference tasks can be distributed across a network of multiple satellites.

In some implementations, the optical link 264 can include a physical connector that permits a physical connection between two satellites. For example, each satellite can be maneuvered in a way, e.g., a trajectory, an orbit, that allows a physical connector of a first satellite 104 to connect to a physical connector of a second satellite 104. A physical connection between two satellites 104 can be desirable, by providing a higher data throughput than the data throughput associated with free-space optical communication or other electromagnetic frequencies. The physical connector of the optical link 264 can be made up of a material that allows for rigid connection to another physical connector, or a flexible material allows that for a wider range of angles for connection.

Referring to the magnetorquer coil 262, the thrusters 276, and the reaction wheels 278, the satellite 104 can be configured to adjust its orientation to allow for improved communication between multiple satellites 104. As a first example, the satellite 104 can adjust its orbit using the magnetorquer coil 262, the thrusters 276, the reaction wheels 278, or some combination thereof, to transition to another type of orbit, to maintain an orbit, to transfer between two different orbital plans, and to prevent collisions with other satellites, debris, or other objects. The satellite 104 can also use the magnetorquer coil 262, the thrusters 276, the reaction wheels 278, or some combination thereof, to de-orbit (e.g., at the conclusion of a mission), coordinate position with another satellite (e.g., formation flying), or perform a type of mission, e.g., increase solar collection, transition operation modes to hibernate during events with ionizing radiation.

As another example, the propulsion layer 271 can configure one or more of the magnetorquer coil 262, the thrusters 276, and the reaction wheels 278, to orient a satellite 104 relative to another satellite 104 such that at least one optical link of each satellite is in a substantially the same line of sight, e.g., an axis, to each other. By orienting two or more satellites 104 in a way that allows at least one optical link from a first satellite to face another optical link from another, different satellite 104, the propulsion layer 271 can allow for distributed computing, e.g., configuring the multiple satellites 104 as a super-pod network for TPU computing. The satellite 104 can be configured to control the propulsion layer 271 in a way that maintains a threshold range from another satellite 104 but within a range of angles that maintain communication between the two satellites 104. For example, the satellite 104 can maintain a distance that allows for data transmission with minimal loss, while avoiding collisions between the two satellites 104 or other objects. In some implementations, the satellite 104 can be configured to detect an amount of solar radiation pressure, e.g., associated with solar energy, and maneuver the satellite based on the forces associated with the detected solar radiation pressure.

Figure 2D:
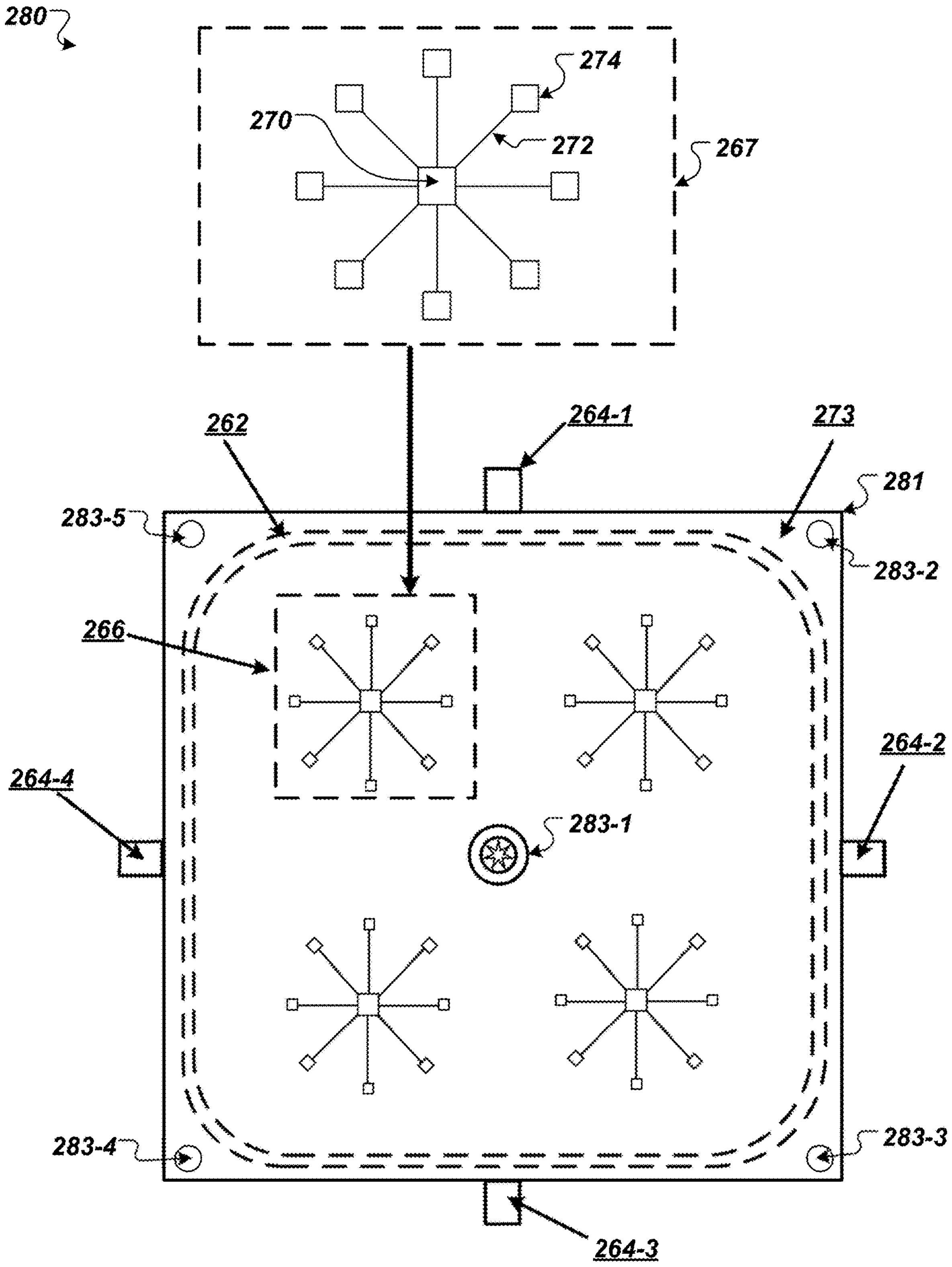
FIG. 2D shows a front view of another example propulsion layer of the AI satellite module.

FIG. 2D shows a front view 280 of another example propulsion layer 281 of the AI satellite module 104. The front view 280 shows an example propulsion layer 281 with similar compute subsystems 266, with a similar callout 267 depicting the radiation shielded ML accelerator 270, heat pipe 272, and heat spreader 274. Similar to the propulsion layer 271 depicted in the perspective view 260 of FIG. 2C, the propulsion layer 281 includes a single thruster 283-1 at a center position of the surface 273, e.g., on an external surface of the satellite module, for the propulsion layer 281. In contrast to the propulsion layer 271, the propulsion layer 281 has a different shape, e.g., parallelogram rather than a circular shape, and includes additional thrusters 283-2 through 283-5, each thruster being substantially equidistant from the central thruster 283-1, e.g., located at the corners of the parallelogram shape. Compared to the thrusters 276-2 through 276-5 that protrude outward from the periphery of the propulsion layer 271, the thrusters 283-2 through 273-5 can be formed into the propulsion layer 281 such that the force generated by the thrusters 283-2 through 283-5 is substantially perpendicular to the surface 273 of propulsion layer 281.

As described in reference to FIG. 1A, the layers of the module 104 can have any shape, e.g., substantially square, hexagonal, rectangular, circular. FIG. 2D depicts the propulsion layer 281 with a substantially square shape and the additional thrusters 283-2 through 283-5 being located at different corners of the propulsion layer 281.

A satellite 104 may have a parallelogram shape (e.g., rectangular, square) or hexagonal shape, to increase a number of satellites that occupy an amount of space, e.g., compared to a circular shape. A parallelogram shape or hexagonal shape may be preferred over a circular shape due to standardized form factor of components, such as solar cells 202 and/or ML accelerators 232. A parallelogram shape or hexagonal shape may also allow for fewer gaps between physically connected satellites in a network of satellites, e.g., compared to a network made up of multiple, physically connected satellites each having a circular shape. As another example, a parallelogram shape or hexagonal shape may be preferred due to the structural stability of said shapes compared to circular shapes, e.g., a satellite having a parallelogram shape or hexagonal shape may have a more uniform load distribution than a satellite with a circular shape.

Figure 2E:
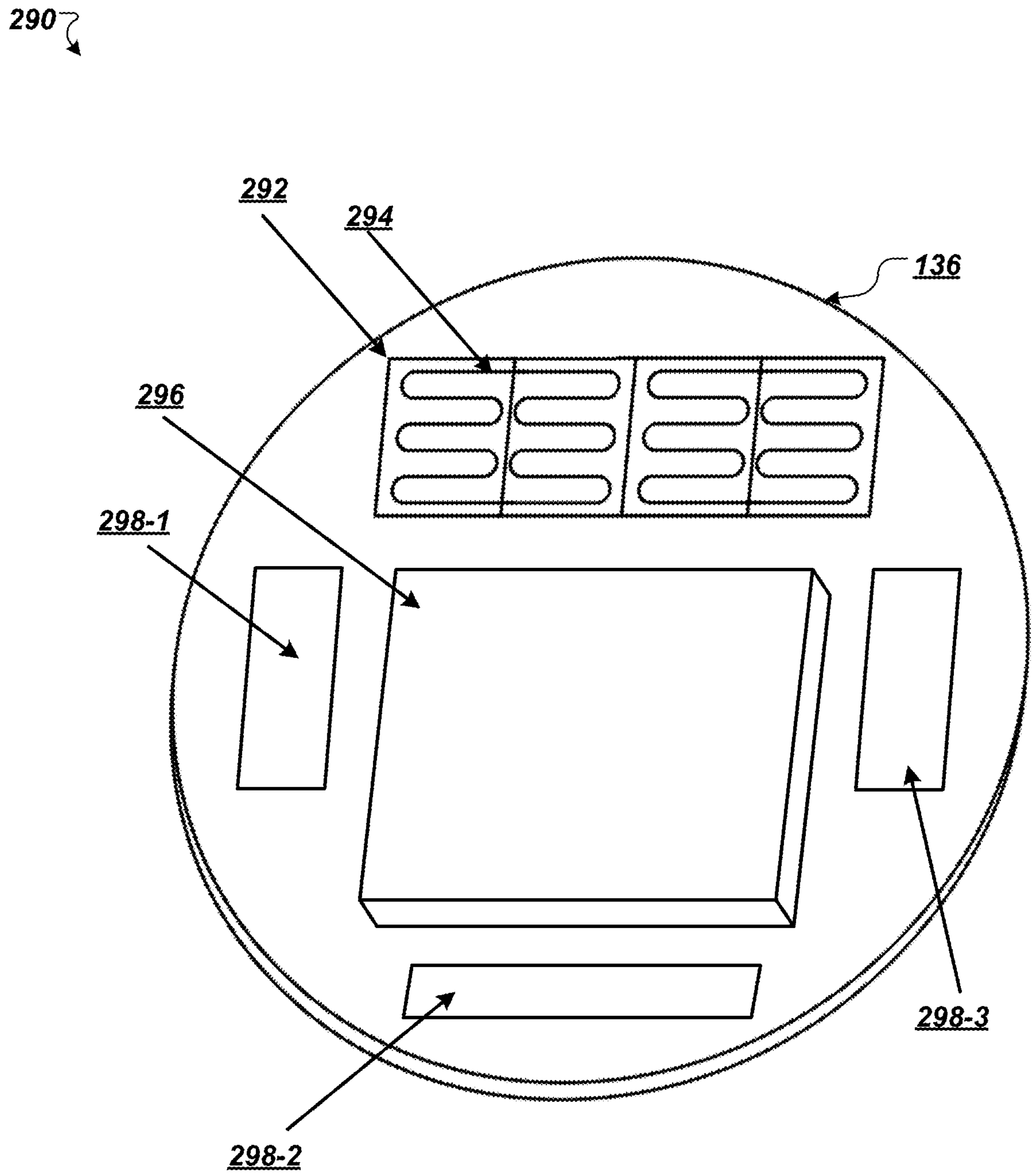
FIG. 2E shows a perspective view of an example heat dissipation layer of the AI satellite module.

FIG. 2E shows a perspective view 290 of an example heat dissipation layer 136 of the AI satellite 104. The heat dissipation layer 136 can include an arrangement 292 of heat pipe structures 294, a vapor chamber 296, and heat spreaders 298-1 through 298-3 (collectively "heat spreaders 298"). The heat pipe structures 294, the vapor chamber 296, and the heat spreaders 298 are examples of heat dissipation components that radiate heat from the satellite 104, e.g., heat generated by the ML hardware layer 134 and/or excess heat generated from converted solar energy from the solar cells 202. The surface of the heat dissipation layer 136 shown by the perspective view 290 can be a rear side or a rear surface of the satellite 104.

The heat pipe structures 294 can be configured to an arrangement 292 based on the arrangement of ML accelerators 232. For example, although FIG. 2E depicts an arrangement that covers an upper portion of the heat dissipation layer 136, the heat dissipation layer 136 can have an arrangement 292 of heat pipe structures 294 that cover a larger surface area than the depiction in FIG. 2E. As another example, the surface area of the arrangement 292 of the heat pipe structures 294 can be substantially equal to the surface area of the ML accelerators in the ML hardware layer 134. The arrangement 292 of the heat pipe structures 294 can also cover a portion of the heat dissipation layer 136 that is positionally similar to the portion of the ML hardware layer 134 that is occupied by the ML accelerators 232.

The heat pipe structures 294 can be phase change heat pipes that conduct heat away from the ML hardware layer 134 and distribute the heat across the rear surface, e.g., the heat dissipation layer 136, of the satellite 104. The heat pipe structures 294 can be aluminum-ammonia heat pipes, copper-water heat pipes, etc. In some implementations, the heat pipe structures 294 can be configured as structural support, e.g., in addition to providing thermal radiation. For example, the heat pipe structures 294 can have an arrangement 292 that provides additional mechanical support to the ML hardware layer 134.

The heat pipe structures 294 can also be optionally coupled to the vapor chamber 296. The vapor chamber 296 can be configured to spread heat across the surface area of the heat dissipation layer 136, by utilizing a working fluid that vaporizes at the heat source, e.g., the ML accelerators 232, spreads as vapor, and condenses back to liquid at cooler regions of the heat dissipation layer 136. In some implementations, the vapor chamber 296 can be a substantially flat, three-dimensional chamber that covers a larger surface area than the vapor chamber 296 depicted in FIG. 2E. In some implementations, one or both of the heat pipe structures 294 and the vapor chamber 296 can be coupled to the heat spreaders 298 to provide additional thermal radiation, e.g., by increasing the surface area for radiating heat, and improve cooling for the satellite 104, e.g., compared to using only the heat pipe structures or the vapor chamber 296. In some implementations, the heat spreaders 298 can be arranged in a way that covers a larger surface area than the heat spreaders 298 depicted in FIG. 2E. In some implementations, the heat spreaders 298 can cover a portion of the heat dissipation layer 136 that has a position on the heat dissipation layer 136 that is similar to a position of the ML accelerators 232 located on the ML hardware layer 134.

Figure 3A:
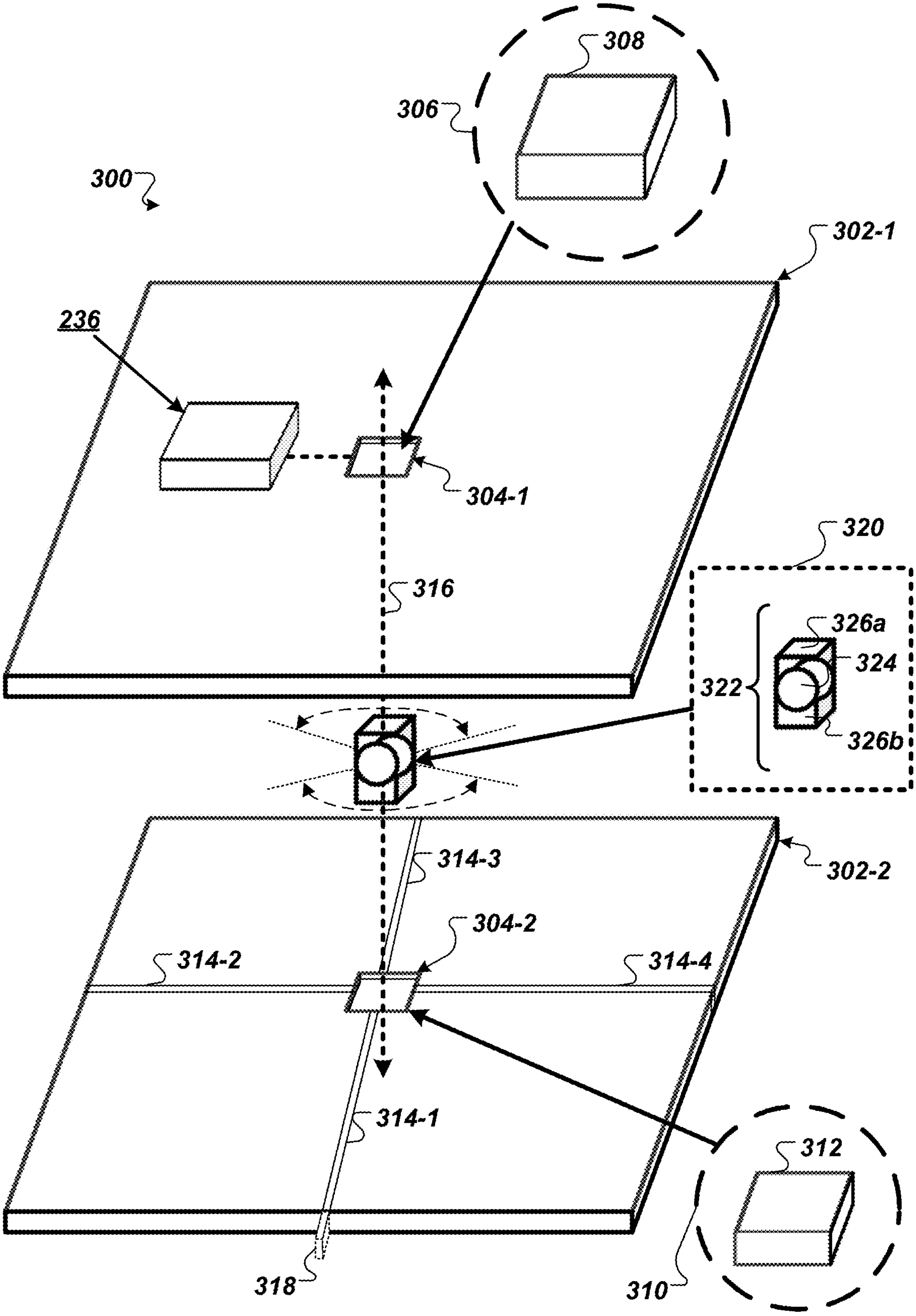
FIG. 3A shows an exploded view of example planar surfaces for the AI satellite module.

FIG. 3A shows a perspective view 300 of example planar surfaces for the AI satellite module 104. The perspective view 300 shows a first planar surface 302-1 and a second planar surface 302-2 (collectively "planar surfaces 302.") Each of the planar surfaces 302 can be part of a layer of the satellite 104, such as the solar panel layer 132, the ML hardware layer 134, the heat dissipation layer 136, the propulsion layers 271 and 281, and the additional layers 135*a* and 135*b*. For example, the first planar surface 302-1 can be part of the ML hardware layer 134 and the second planar surface 302-2 can be part of the heat dissipation layer 136. The first planar surface 302-1 can include a first aperture 304-1 depicted at a central location of the first planar surface 302-1, and the second planar surface 302-2 can include a second aperture 304-2 depicted at a central location of the second planar surface 302-2.

The exploded view 300 also shows a central axis 316 to show a substantial alignment of the first aperture 304-1 of the first planar surface 302-1, relative to the second aperture 304-2 of the second planar surface 302-2. The first planar surface 302-1 can include a physical connector 308, depicted by callout 306 in FIG. 3A. The physical connector 308 can be supported at the first aperture 304-1 of the first planar surface 302-1, e.g., positioned at the central location of the first aperture 304-1 on the first planar surface 302-1. In some implementations, the physical connector 308 can be attached to the first planar surface 302-1 at the first aperture 304-1, e.g., covering some or all of the opening formed by the first aperture 304-1. The physical connector 308 can be configured to receive and transmit signals and other types of data throughout the layer of the first planar surface 302-1. In some cases, the physical connector 308 can receive and transmit data from other layers coupled to the layer for the first planar surface 302-1.

In some implementations, the physical connector 308 can receive data from and transmit data to a component mounted or formed in the layer for the first planar surface 302-1. For example, the first planar surface 302-1 can also include a subsystem 236, e.g., a subsystem configured for control, communication, power delivery, maneuver and orbit control, or some combination thereof. The subsystem 236 depicted in FIG. 3A can be a communication subsystem 236 configured to exchange data communications throughout the layer for the first planar surface 302-1 but can also exchange data communications with another satellite module. For example, the satellite 104 can be oriented and maneuvered to a position that permits the physical connector 308 of the satellite 104 to physically connect to another physical connector 308 of a different satellite 104, e.g., the other physical connector 308 also being supported by a respective aperture positioned at a central location of a planar surface for the different satellite 104. For example, the second planar surface 302-2 can be a layer of a second satellite 104 and can also include a second physical connector 308 that couples to the physical connector 308 of the first satellite 104, e.g., communicating data between the first satellite 104 and the second satellite 104.

Referring to the second planar surface 302-2 depicted in FIG. 3A, the layer of the second planar surface 302-2 can include intersatellite links 314-1 through 314-4 (collectively "intersatellite links 314"). The intersatellite links 314 can be an example of the optical links 264 described in reference to FIGS. 2C and 2D above, e.g., further including an optical lens, related components, and communication pathways that allow for data transmission with other layers in the satellite 104 and other satellites. In some implementations, one or more of the intersatellite links 314 can include a physical connector 318 that protrudes from a periphery of the layer for the second planar surface 302-2. For example, FIG. 3A depicts a single physical connector 318 at a bottom portion of the second planar surface 302-2 but the second planar surface 302-2 can include a physical connector 318 for each of the intersatellite links 314.

The second planar surface 302-2 can also include a central module 312, depicted by callout 310. The central module 312 can be positioned at the second aperture 304-2, e.g., covering some or all of the opening formed by the second aperture 304-2. The central module 312 can be supported by the second aperture 304-2, e.g., disposed in or coupled to the second aperture 304-2. In this way, the central module 312 can include the intersatellite links 314 and allow for data to be transmitted from the layer of the second planar surface 302-2.

In some implementations, the physical connector 308 can be an example physical connector 322 depicted in callout 320. The physical connector 322 depicted in callout 320 can include a first end 326*a* that can be adjacent to the first planar surface 302-1, e.g., at the first aperture 304-1. The physical connector 322 can also include a second end 326*b* opposite to the first end 326*a*, and further include a swivel member 324 that permits the second end 326*b* to be positionable relative to the first end 326*a*. The swivel member 324 can allow for two different layers of the satellite 104 to be oriented independently from each other, e.g., relative to the central axis 316.

For example, the first planar surface 302-1 of a first layer of the satellite 104 can be the solar panel layer 132 while the second planar surface 302-2 of a second layer of the satellite 104 can bean ML layer, a communication layer, a heat dissipation layer, a propulsion layer, etc. For example, the solar cells 202 in the first layer can be oriented in a first direction (e.g., orientation, attitude, or other type of angle) and components of the second layer can be positioned towards a second direction different from the first direction. The satellite 104 can maintain a first target direction (e.g., angle, orientation) for the solar cells 202 that maximizes collection of solar energy, and maintain a second target direction (e.g., angle, orientation) that maximizes another aspect of the satellite 104, e.g., heat dissipation, maneuver, control, communication etc.

Although the first aperture 304-1 and the second aperture 304-2 are depicted in FIG. 3A having a substantially square shape, the apertures can be any shape, e.g., circular, hexagonal, rectangular. The physical connector 308, physical connector 322, and/or the central module 312, can be any appropriate shape that allows the respective connector or module to be supported by the respective aperture, e.g., the connector or module can have a shape that permits the connector or module to be inserted in, coupled to, or supported by the aperture.

Figure 3B:
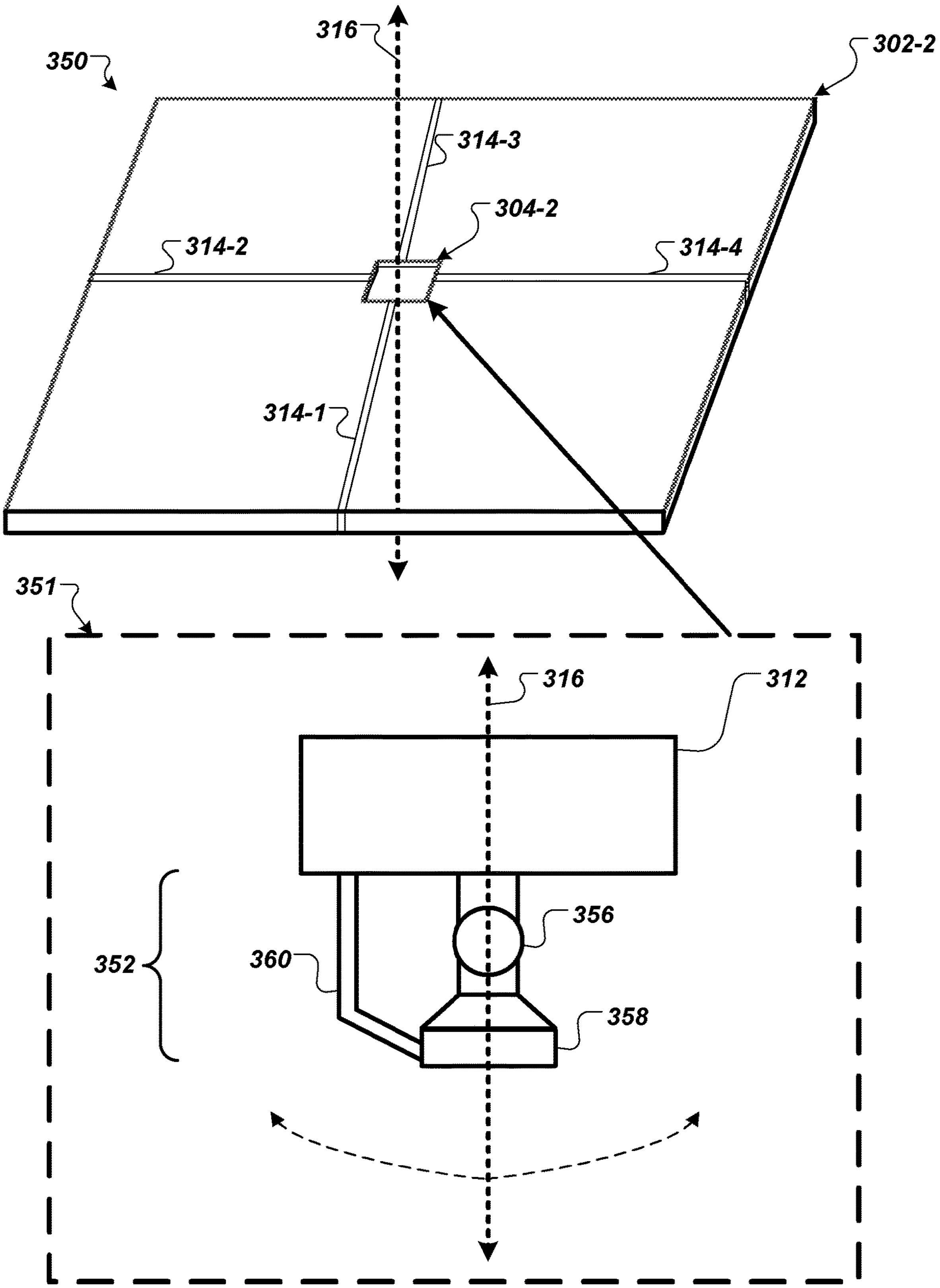
FIG. 3B shows an exploded view and a front view of the example planar surfaces of FIG. 3A for the AI satellite module.

FIG. 3B shows a perspective view 350 and a front view 351 of the example planar surface, e.g., second planar surface 302-2, of FIG. 3A for the AI satellite module. The front view 351 illustrates an example central module 312 that further includes a gimbaled thrust system 352 that can be supported by the second aperture 304-2 of the second planar surface 302-2. For example, the central module 312 includes the gimbaled thrust system 352 and can be configured to maneuver, orient, or adjust the second planar surface 302-2.

The gimbaled thrust system 352 includes a directional thruster 358, a gimbal bearing 356, and an actuator 360. The gimbal bearing 356 and the actuator 360 can be configured to provide adjustments to the directional thruster 358, such as by rotating the directional thruster 358 about a central axis 316 of the second aperture 304-2. In some implementations, the gimbaled thrust system 352 includes multiple directional thrusters 358, each directional thruster having a corresponding actuator to provide independent control for the respective directional thruster. This example configuration can allow for the intersatellite links 314 of the layer for the second planar surface 302-2 to be oriented in a first direction, while a second layer for the first planar surface 302-1 can be oriented in a second direction, e.g., a solar panel layer facing a source of solar energy. This configuration allows for two independently controllable planar surfaces, e.g., first planar surface 302-1 and second planar surface 302-2, for the satellite 104.

In some implementations, each of the directional thrusters 358 of the gimbaled thrust system 352 is configured to provide thrust vectoring functionality. For example, the directional thruster 358 includes a thrust vectoring nozzle that can be swiveled, relative to the second aperture 304-2, on at least two axes (e.g., pitch and yaw) from side to side. A s the nozzle is moved (or vectored), the direction of the thrust is changed relative to a central axis 316 (or center of mass) of the satellite module. In some implementations, the gimbaled thrust system 352 can include a single directional thruster 358, such as thruster 276-1 and thruster 283-1, described in reference to FIGS. 2C and 2D, respectively.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPU (General purpose graphics processing unit).

Computers suitable for the execution of a computer program include, by way of example, can be general or special purpose microprocessors or both, or any other kind of central processing unit. Generally, a central processing unit will receive instructions and data from a read only memory or a random-access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to allow interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A satellite module comprising:

a solar panel comprising:
  i) a first side that includes a plurality of solar cells; and
  ii) a second side that includes a power delivery network configured to distribute power signals generated by the plurality of solar cells;

at least one machine-learning ("ML") hardware accelerator adjacent the solar panel, the at least one ML hardware accelerator configured to implement a neural network ML model; and a heat dissipation layer configured to radiate heat generated when the at least one ML hardware accelerator is powered by the power signals, wherein the heat dissipation layer comprises a plurality of heat pipes that are coupled to the at least one ML hardware accelerator and are configured to dissipate heat generated when the at least one ML hardware accelerator executes a training or inference workload of the neural network ML model.

2. The satellite module of claim 1, wherein the at least one ML hardware accelerator is intermediate the solar panel and the heat dissipation layer.

3. The satellite module of claim 1, further comprising:

a frame configured as a support structure, wherein one or both of the solar panel and the heat dissipation layer are supported by the frame.

4. The satellite module of claim 1, further comprising:

a filter layer adjacent the first side of the solar panel, the filter layer being configured to filter wavelengths of light that correspond to a particular portion of the electromagnetic spectrum.

5. The satellite module of claim 4, wherein the filter layer is a transparent, glass, IR cut-off filter comprising an anti-reflective property.

6. The satellite module of claim 3, further comprising:

a substrate layer at the second side of the solar panel and adjacent the power delivery network, wherein the substrate layer is configured to provide a measure of structural rigidity to the plurality of solar cells of the solar panel.

7. The satellite module of claim 6, wherein the substrate layer is a thin-film metal substrate comprising a particular thermal radiation emissivity that is supplemental to a thermal radiation property of the heat dissipation layer.

8. The satellite module of claim 6, wherein the substrate layer comprises a plurality of sublayers configured as a composite metal stack configured to provide:

i) thermal spreading;

ii) heat dissipation; and iii) structural stiffness in support of the solar panel.

9. The satellite module of claim 6, further comprising:

a carbon fiber exoskeleton that is configured as an extension of: i) the substrate layer and ii) the support structure of the frame.

10. The satellite module of claim 9, wherein the carbon fiber exoskeleton comprises vibration damping properties that enable the carbon fiber exoskeleton to withstand stresses imparted on the satellite module when the satellite module is launched into orbit.

11. The satellite module of claim 1, wherein the at least one ML hardware accelerator is a tensor processing unit (TPU) configured to perform ML computations by executing matrix multiplication on multi-dimensional matrices during a training phase or an inference phase of the neural network ML model.

12. The satellite module of claim 3, wherein the heat dissipation layer comprises a vapor chamber coupled to at least one heat pipe of the plurality of heat pipes.

13. The satellite module of claim 8, wherein:

i) a signal routing aspect of the power delivery network is disposed at a first sublayer of the plurality of sublayers; and ii) the at least one ML hardware accelerator is disposed at a second sublayer of the plurality of sublayers.

14. The satellite module of claim 13, further comprising:

a control module disposed at the second sublayer and configured to control operation of the satellite module based on control signals that traverse different communication pathways of the satellite module.

15. The satellite module of claim 14, wherein a subset of the communication pathways is configured to transmit data comprising control signals between the control module and the at least one ML hardware accelerator.

16. The satellite module of claim 14, wherein a subset of the communication pathways is configured to transmit data comprising compute data between the control module and the at least one ML hardware accelerator.

17. The satellite module of claim 14, wherein the satellite module further comprises at least two ML hardware accelerators, wherein the at least one ML hardware accelerator is included among the at least two ML hardware accelerators, and wherein a subset of the communication pathways is configured to transmit data between the at least two ML hardware accelerators.

18. The satellite module of claim 14, further comprising a plurality of subsystems, wherein the plurality of subsystems comprises a propulsion subsystem for controlling a thruster of the satellite module, wherein the thruster is disposed along a periphery or external surface of the satellite module.

19. The satellite module of claim 14, further comprising a plurality of subsystems, wherein the plurality of subsystems comprises a propulsion subsystem for controlling a plurality of directional thrusters, wherein each of the plurality of directional thrusters is arranged at a different location along a periphery or external surface of the satellite module relative to another thruster of the plurality of thrusters.

20. The satellite module of claim 18, wherein the propulsion subsystem includes a plurality of control mechanisms comprising one or more of: i) a reaction wheel, ii) a control moment gyroscope, and iii) a magnetorquer.

21. The satellite module of claim 14, further comprising a communication subsystem disposed at the substrate layer.

22. The satellite module of claim 21, further comprising:

a first aperture at a central location of a first planar surface of the satellite module; and at least one physical connector supported at the first aperture, wherein the at least one physical connector is associated with the communication subsystem and is configured to exchange data communications with another satellite module.

23. The satellite module of claim 22, wherein the at least one physical connector comprises:

i) a first end adjacent the first planar surface;

ii) a swivel member at the first end; and ii) a second end opposite the first end, the second end being positionable relative to the first end by way of the swivel member.

24. The satellite module of claim 22, further comprising:

a second aperture at a central location of a second planar surface of the satellite module; and a central module disposed in the second aperture, the central module comprising one or more inter-satellite links that are configured to be oriented independent of the plurality of solar cells of the solar panel.

25. The satellite module of claim 24, wherein the central module comprises:

a gimbaled thrust system supported by the second aperture, the gimbaled thrust system comprising a directional thruster that is rotatable about a central axis of the second aperture.

26. The satellite module of claim 14, further comprising:

one or more electromagnetic coils integrated at the substrate layer, wherein the one or more electromagnetic coils are configured to generate a magnetic field using current signals generated by the solar panel, and the magnetic field provides a magnetic dipole propulsion source of the satellite module.

27. A satellite comprising:

a satellite bus comprising:

at least one machine-learning ("ML") hardware accelerator configured to implement a neural network ML model; and a heat dissipation layer configured to radiate heat generated when the at least one ML hardware accelerator is powered by power signals; and one or more solar arrays coupled to the satellite bus, each of the one or more arrays comprising:

i) a first side that includes a plurality of solar cells; and ii) a second side that includes a power delivery network configured to distribute the power signals generated by the plurality of solar cells, wherein the heat dissipation layer comprises a plurality of heat pipes that are coupled to the at least one ML hardware accelerator and dissipate heat generated when the at least one ML hardware accelerator executes a training or inference workload of the neural network ML model.

28. The satellite of claim 27, wherein each of the one or more solar arrays comprises an array of foldable panels.

29. The satellite of claim 27, wherein each of the one or more solar arrays is coupled to the satellite bus by a respective deployment mechanism.

30. The satellite of claim 29, wherein the respective deployment mechanism of each of the one or more solar arrays is configured to extend the respective solar array along an outward direction that is substantially perpendicular to a surface of the satellite bus.

31. The satellite of claim 30, wherein extending the respective solar array along the outward direction comprises unfolding the array of foldable panels.

32. The satellite of claim 29, wherein the respective deployment mechanism of each of the one or more solar arrays is configured to retract the respective solar array along an inward direction that is substantially perpendicular to a surface of the satellite bus.

33. The satellite of claim 32, wherein retracting the respective solar array along the inward direction comprises folding the array of foldable panels.

34. The satellite of claim 29, wherein the respective deployment mechanism of each of the one or more solar arrays is configured to adjust an angle of orientation of the respective solar array by rotating the respective solar array about an axis that is substantially perpendicular to a surface of the satellite bus.

35. The satellite of claim 27, wherein the satellite bus further comprises a sublayer coupled to one or both of the at least one ML hardware accelerator and the heat dissipation layer.

36. The satellite of claim 35, wherein a control module is at the sublayer and configured to control operation of the satellite based on control signals that traverse different communication pathways of the satellite.

37. The satellite of claim 36, wherein a subset of the communication pathways is configured to transmit data comprising control signals between the control module and the at least one ML hardware accelerator.

38. The satellite of claim 36, wherein a subset of the communication pathways is configured to transmit data between the control module and the at least one ML hardware accelerator.

39. The satellite of claim 36, wherein the satellite further comprises at least two ML hardware accelerators, wherein the at least one ML hardware accelerator is included among the at least two ML hardware accelerators and wherein a third subset of the communication pathways is configured to transmit data between at least two ML hardware accelerators.

* * * * *